United States Patent
Gupta et al.

(10) Patent No.: US 10,152,798 B2
(45) Date of Patent: Dec. 11, 2018

(54) SYSTEMS, METHODS AND, MEDIA FOR DETERMINING OBJECT MOTION IN THREE DIMENSIONS USING SPECKLE IMAGES

(71) Applicant: Wisconsin Alumni Research Foundation, Madison, WI (US)

(72) Inventors: Mohit Gupta, Madison, WI (US); Brandon M. Smith, Madison, WI (US); Pratham H. Desai, Madison, WI (US); Vishal R. Agarwal, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 44 days.

(21) Appl. No.: 15/483,007

(22) Filed: Apr. 10, 2017

(65) Prior Publication Data

US 2018/0293739 A1 Oct. 11, 2018

(51) Int. Cl.
*G06K 9/00* (2006.01)
*G06T 7/246* (2017.01)
(Continued)

(52) U.S. Cl.
CPC .......... *G06T 7/248* (2017.01); *G06K 9/00355* (2013.01); *G06K 9/4661* (2013.01);
(Continued)

(58) Field of Classification Search
None
See application file for complete search history.

(56) References Cited

U.S. PATENT DOCUMENTS 6,642,506 B1 * 11/2003 Nahum .................. G01B 3/205
250/231.13
7,292,232 B2 * 11/2007 Ranta .................... G06F 3/0421
345/157
(Continued)

OTHER PUBLICATIONS

R. Bamler and M. Eineder, "Accuracy of differential shift estimation by correlation and split-bandwidth interferometry for wideband and delta-κ SAR systems," in IEEE Geoscience and Remote Sensing Letters, vol. 2, No. 2, pp. 151-155, Apr. 2005. doi: 10.1109/LGRS.2004.843203.*

(Continued)

*Primary Examiner* — Tahmina Ansari
(74) *Attorney, Agent, or Firm* — Quarles & Brady LLP

(57) ABSTRACT

In accordance with some embodiments, systems, methods and media for determining object motion in three dimensions using speckle images are provided. In some embodiments, a system for three dimensional motion estimation is provided, comprising: a light source; an image sensor; and a hardware processor programmed to: cause the light source to emit light toward the scene; cause the image sensor to capture a first defocused speckle image of the scene at a first time and capture a second defocused speckle image of the scene at a second time; generate a first scaled version of the first defocused image; generate a second scaled version of the first defocused image; compare each of the first defocused image, the first scaled version, and the second scaled version to the second defocused image; and determine axial and lateral motion of the object based on the comparisons.

24 Claims, 10 Drawing Sheets

(51) Int. Cl.
*G06K 9/62* (2006.01)
*G06K 9/46* (2006.01)

(52) U.S. Cl.
CPC ......... *G06K 9/6251* (2013.01); *G06K 9/6256* (2013.01); *G06K 9/6277* (2013.01); *G06K 2209/401* (2013.01); *G06T 2207/10028* (2013.01)

(56) References Cited

U.S. PATENT DOCUMENTS

| | | | |
|---|---|---|---|
| 7,433,024 B2 | 10/2008 | Garcia | |
| 7,715,016 B2* | 5/2010 | Hwang | G01B 11/002 345/166 |
| 8,314,774 B1* | 11/2012 | Zeng | G06F 3/0317 345/157 |
| 8,692,880 B2* | 4/2014 | Tobiason | G01B 11/00 348/140 |
| 9,610,061 B2* | 4/2017 | Ebbini | A61B 8/06 |
| 2008/0181477 A1* | 7/2008 | Izatt | A61B 3/102 382/128 |
| 2012/0086944 A1* | 4/2012 | Chrien | B64G 1/66 356/450 |
| 2012/0283564 A1* | 11/2012 | Ebbini | A61B 8/06 600/439 |
| 2013/0066211 A1* | 3/2013 | Konofagou | A61B 8/08 600/450 |

OTHER PUBLICATIONS

Jo, et al., "SpeDo: 6 DOF Ego-Motion Sensor Using Speckle Defocus Imaging," 2015, pp. 4319-4327.
Zalevsky, et al., Simultaneous remote extraction of multiple speech sources and heart beats from secondary speckles pattern, Optics Express, 2009.
Lien, et al., ACM Trans. Graph., vol. 35, No. 4, Article 142, Publication Date: Jul. 2016.
Garcia, et al., Soli: Ubiquitous Gesture Sensing with Millimeter Wave Radar, Three-dimensional mapping and range measurement by means of projected speckle patterns, Applied Optics, vol. 47, No. 16, Jun. 1, 2008.

* cited by examiner

300

SYSTEMS, METHODS AND, MEDIA FOR DETERMINING OBJECT MOTION IN THREE DIMENSIONS USING SPECKLE IMAGES

CROSS-REFERENCE TO RELATED APPLICATIONS

N/A

STATEMENT REGARDING FEDERALLY SPONSORED RESEARCH

N/A

BACKGROUND

In recent years with advancements in digital imaging, image sensors have become more popular for measuring macroscopic motions in a scene in three dimensions. However, estimating small motions in three dimensions using image sensors remains a difficult problem. Speckle imaging is widely used for micro-motion estimation in several applications, including industrial inspection, scientific imaging, and user interfaces (e.g., optical mice). However, current speckle imaging techniques are largely limited to measuring 2D motion (e.g., parallel to the sensor image plane) of a single rigid object. That is, current speckle imaging techniques are generally only useful for estimating the motion of a single object, and are not suitable for measuring motion toward or away from the sensor (i.e., axial motion).

Measuring micro-motions at macroscopic stand-off distances is not possible with conventional cameras and vision systems without using sophisticated optics. Furthermore, measuring multi-object or non-rigid motion is fundamentally more challenging than tracking a single object due to the considerably higher number of degrees of freedom, especially if the objects are devoid of high-frequency texture.

Accordingly, systems, methods, and media for determining object motion in three dimensions using speckle images are desirable.

SUMMARY

In accordance with some embodiments of the disclosed subject matter, systems, methods, and media for determining object motion in three dimensions using speckle images are provided.

In accordance with some embodiments of the disclosed subject matter, a system for three dimensional motion estimation is provided, the system comprising: a light source configured to emit temporally coherent light toward a scene; an image sensor; and a hardware processor that is programmed to: cause the light source to emit light toward the scene; cause the image sensor to capture a first defocused image of the scene at a first time, wherein the first defocused image includes a first speckle pattern generated by an object in the scene reflecting the light emitted by the light source; cause the image sensor to capture a second defocused image of the scene at a second time, wherein the second defocused image includes a second speckle pattern generated by the object in the scene reflecting the light emitted by the light source; generate a first scaled version of the first defocused image by expanding the first defocused image by a predetermined amount; generate a second scaled version of the first defocused image by contracting the first defocused image by the predetermined amount; compare the first defocused image to the second defocused image; compare the first scaled version of the first defocused image to the second defocused image; compare the second scaled version of the first defocused image to the second defocused image; determine axial motion of the object between the first time and the second time based on the comparisons; and determine lateral motion of the object between the first time and second time based on the comparisons.

In some embodiments, the hardware processor is further programmed to: calculate, for the first defocused image, a first two-dimensional cross-correlation with the second defocused image, wherein the first two-dimensional cross-correlation includes a peak with a first intensity at a first location, the first intensity indicative of how closely the first speckle pattern in the first defocused image matches the second speckle pattern in the second defocused image and the first location indicative of lateral motion of the object between the first time and the second time; calculate, for the first scaled version of the first defocused image, a second two-dimensional cross-correlation with the second defocused image, wherein the second two-dimensional cross-correlation includes a peak with a second intensity at a second location, the second intensity indicative of how closely the first speckle pattern in the first scaled version of the first defocused image matches the second speckle pattern in the second defocused image and the second location indicative of lateral motion of the object between the first time and the second time; and calculate, for the second scaled version of the first defocused image, a third two-dimensional cross-correlation with the second defocused image; wherein the third two-dimensional cross-correlation includes a peak with a third intensity at a third location, the third intensity indicative of how closely the first speckle pattern in the second scaled version of the first defocused image matches the second speckle pattern in the second defocused image and the third location indicative of lateral motion of the object between the first time and the second time.

In some embodiments, the hardware processor is further programmed to: compare at least the intensity of the first peak, the second peak, and the third peak; and select a version of the first defocused image that includes the largest intensity peak; and determine the axial motion of the object based on the scale of the selected version of the first defocused image.

In some embodiments, the hardware processor is further programmed to: receive information indicating that the motion of the object between the first time and the second corresponds to a first hand gesture; generate motion information indicative of motion of the object between the first time and the second time based on the axial motion and the lateral motion; provide the motion information as input to a classification model as training data for training the classification model to recognize the first hand gesture input; generate a trained classification model using the input, wherein the trained classification model is configured to receive motion information of a scene as input and output a likelihood that the received motion information corresponds to the first hand gesture.

In some embodiments, the hardware processor is further programmed to: cause the light source to emit light toward a second scene that is different than the scene subsequent to generating the trained classification model; cause the image sensor to capture a third defocused image of the second scene at a third time, wherein the third defocused image includes a third speckle pattern generated by an object in the second scene reflecting the light emitted by the light source; cause the image sensor to capture a fourth defocused image of the second scene at a fourth time, wherein the fourth defocused image includes a fourth speckle pattern generated by the object in the second scene reflecting the light emitted by the light source; generate a first scaled version of the third defocused image by expanding the first defocused image by a predetermined amount; generate a second scaled version of the third defocused image by contracting the first defocused image by the predetermined amount; compare the third defocused image to the fourth defocused image; compare the first scaled version of the third defocused image to the fourth defocused image; compare the second scaled version of the third defocused image to the fourth defocused image; determine second axial motion of the object in the second scene between the third time and the fourth time based on the comparisons; determine second lateral motion of the object in the second scene between the third time and fourth time based on the comparisons; generate second motion information indicative of motion of the object in the second scene between the third time and the fourth time based on the second axial motion and the second lateral motion; provide the second motion information as input to the trained classification model; and receive output from the trained classification model indicating a likelihood that the motion in the second scene corresponds to the first hand gesture.

In some embodiments, the light source comprises a laser diode.

In some embodiments, the coherence area of the temporally coherent light at the object is less than 1 mm.

In some embodiments, the first defocused image includes a first total speckle pattern with contributions from the first speckle pattern and a third speckle pattern generated by a second object in the scene, the second defocused image includes a second total speckle pattern with contributions from the second speckle pattern and a fourth speckle pattern generated by the second object in the scene, and the hardware processor is further programmed to: generate a third scaled version of the first defocused image by expanding the first defocused image by a second predetermined amount; compare the third scaled version of the first defocused image to the second defocused image; determine axial motion of the second object between the first time and the second time based on the comparisons; and determine lateral motion of the second object between the first time and second time based on the comparisons In accordance with some embodiments of the disclosed subject matter, a method for three dimensional motion estimation is provided, the method comprising: causing a light source to emit temporally coherent light toward a scene; causing an image sensor to capture a first defocused image of the scene at a first time, wherein the first defocused image includes a first speckle pattern generated by an object in the scene reflecting the light emitted by the light source; causing the image sensor to capture a second defocused image of the scene at a second time, wherein the second defocused image includes a second speckle pattern generated by the object in the scene reflecting the light emitted by the light source; generating a first scaled version of the first defocused image by expanding the first defocused image by a predetermined amount; generating a second scaled version of the first defocused image by contracting the first defocused image by the predetermined amount; comparing the first defocused image to the second defocused image; comparing the first scaled version of the first defocused image to the second defocused image; comparing the second scaled version of the first defocused image to the second defocused image; determining axial motion of the object between the first time and the second time based on the comparisons; and determining lateral motion of the object between the first time and second time based on the comparisons.

In accordance with some embodiments of the disclosed subject matter, a non-transitory computer readable medium containing computer executable instructions that, when executed by a processor, cause the processor to perform a method for three dimensional motion estimation is provided, the method comprising: causing a light source to emit temporally coherent light toward a scene; causing an image sensor to capture a first defocused image of the scene at a first time, wherein the first defocused image includes a first speckle pattern generated by an object in the scene reflecting the light emitted by the light source; causing the image sensor to capture a second defocused image of the scene at a second time, wherein the second defocused image includes a second speckle pattern generated by the object in the scene reflecting the light emitted by the light source; generating a first scaled version of the first defocused image by expanding the first defocused image by a predetermined amount; generating a second scaled version of the first defocused image by contracting the first defocused image by the predetermined amount; comparing the first defocused image to the second defocused image; comparing the first scaled version of the first defocused image to the second defocused image; comparing the second scaled version of the first defocused image to the second defocused image; determining axial motion of the object between the first time and the second time based on the comparisons; and determining lateral motion of the object between the first time and second time based on the comparisons.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can, for example, include systems, methods, and media) for determining object motion in three dimensions using speckle images are provided.

In some embodiments, the mechanisms described herein can facilitate measurements of object motion in a scene using speckle imaging, in which a scene is illuminated with a coherent light source (e.g., a laser diode) and imaged with an image sensor. In such embodiments, when the coherent light interacts with optically rough surfaces in the scene, a high-frequency speckle pattern is created in the captured images. As described below, the motion of objects in the scene results in shifts in the speckle pattern captured in the images, which can be used to estimate the motion of the object. For example, a lateral shift of an object can result in a corresponding lateral shift in the speckle pattern (e.g., as described below in connection with FIGS. 3A and 3B), while an axial shift (e.g., toward or away from the image sensor) can result in a corresponding expansion or contraction in the speckle pattern (e.g., as described below in connection with FIG. 3C).

In some embodiments, the mechanisms described herein can compare the speckle pattern captured in two images captured at different times and estimate motion of objects in the scene between the first image to the second image based on shifts in the speckle pattern from the first image to the second image.

Figure 1:
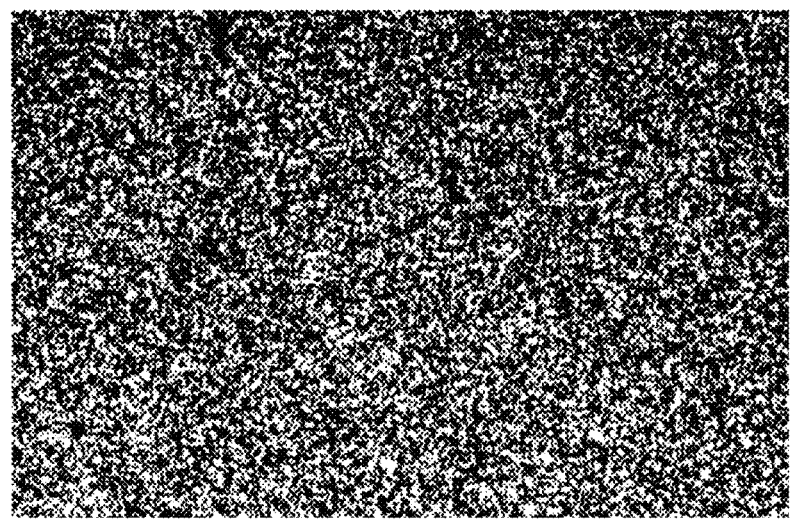
FIG. 1 shows an example of a speckle pattern created when coherent light reflects from one or more objects in a scene in accordance with some embodiments of the disclosed subject matter.

FIG. 1 shows an example of a speckle pattern created when coherent light reflects from one or more objects in a scene in accordance with some embodiments of the disclosed subject matter. Movement of the speckle resulting from relative motion between one or more objects in the scene and the image sensor (and/or light source) can be measured to determine the relative motions of the one or more objects in the scene. Changes in the speckle pattern due to lateral motion of an object are typically one to two orders of magnitude greater than changes due to axial motion with the same magnitude change in position. Small object motion does not change the speckle pattern, but only translates or scales it by a small amount. This result is sometimes referred to as the homology condition or the memory effect. The homology condition has previously been exploited for a variety of applications in speckle based metrology, including deformation measurement of large structures such as aircraft wings and submarine walls, imaging through scattering media, and camera-based ego-motion estimation.

In some embodiments, the mechanisms described herein can use a global scale-space based analysis of a sequence of captured speckle images to determine the motion of objects in the images, rather than attempting to compute local speckle movement in the images, as has been previously proposed. For example, a system using the mechanisms described herein can measure small axial object motion (e.g., on the order of <100 microns at 1 meter distance), which is an order of magnitude higher axial motion sensitivity compared to some existing techniques for measuring axial motion using optically captured perspective images.

In general, the motion sensitivity of a speckle imaging system can be directly proportional to the amount of sensor defocus, such that the motion sensitivity increases as the focus of the scene decreases. Accordingly, using (or omitting) to create a highly defocused image can increase the sensitivity to motion, which can be especially advantageous when determining axial motion. For example, an imaging system without a focusing lens (e.g., a bare sensor) can result in greater motion sensitivity. In such an example, an imaging system with a bare sensor can also be less costly, and less complex than a typical camera that is meant to capture well-focused images of a scene. One tradeoff with greater defocus is generally greater overlap between speckle patterns generated by different objects in the scene. For example, a speckle image of a scene with multiple objects can have a speckle pattern that is a combination of speckle patterns from different objects, and in some cases can also include cross-speckle caused by interference of light from different objects. In such an example, the resulting speckle pattern may not behave in the same way that it would due to rigid motion of a single object, and thus, individual object motions may not be recoverable. However, if a light source with relatively high temporal coherence, but relatively low spatial coherence is used to generate the speckle pattern, the cross-speckle term may be negligible. While this can allow the contributions from individual object motions to be determined, with a bare sensor it does not allow individual objects in the scene to be tracked using only the speckle motion. Rather, the mechanisms described herein can be used to measure aggregate motion statistics of the scene based on changes in the speckle pattern, which can, for example, be represented as a 3D motion histogram. Such a 3D motion histogram can be used to, for example, recover the dynamic configuration of the scene to recognize micro hand gestures.

In some embodiments, the mechanisms described herein can optically magnify the motion information from a scene by capturing the images with a relatively high amount of defocus (e.g., by capturing the scene using a sensor with no focusing optics). While the speckle patterns captured by the mechanisms described herein are generally not useful to a human viewer, they can instead be used for quantitative motion measurement and analysis of the scene, whereas conventional video motion magnification techniques may be more useful to a human viewer.

The mechanisms described herein can be useful in many applications. For example, the ability to measure relatively small (e.g., 10-100 microns) non-rigid or multi-object motion can be used in evaluating motion of cells in a biological sample, hand-gesture recognition for a user interface, motion of molecules during chemical reactions, motion of fluids, etc.

Figure 2A:
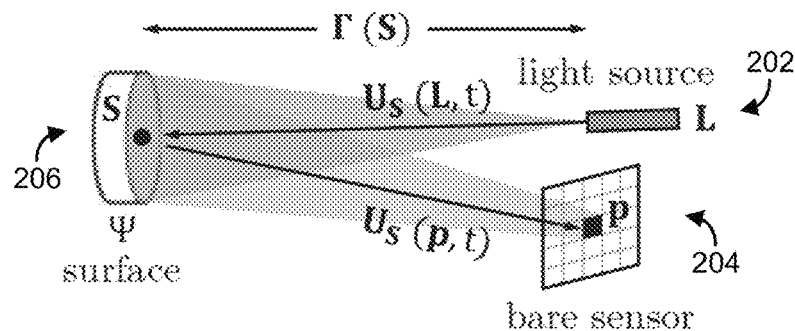
FIGS. 2A and 2B show an example of system for capturing speckle images of a scene including an optically rough surface in accordance with some embodiments of the disclosed subject matter.
Figure 2B:
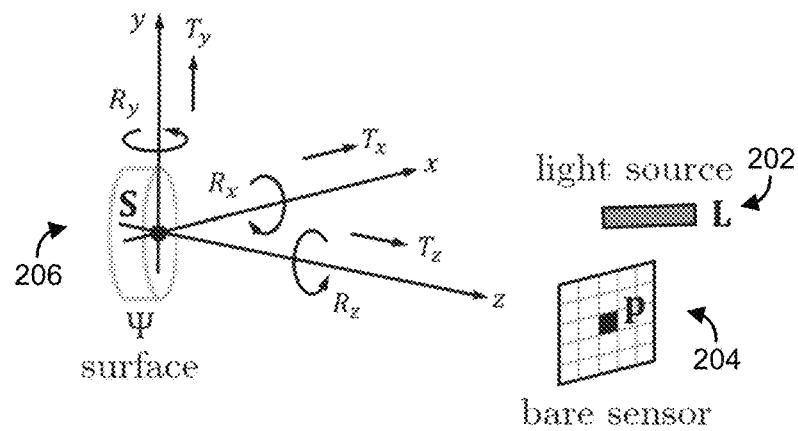

FIGS. 2A and 2B show an example 200 of system for capturing speckle images of a scene including an optically rough surface Ψ in accordance with some embodiments of the disclosed subject matter. In some embodiments, system 200 can include a light source 202 that emits light toward a surface 206, and a bare image sensor 204 (e.g., an image sensor with no focusing optics) that captures images of the speckle pattern generated by surface 206 reflecting light from light source 202. In some embodiments, light source 202 can be a temporally coherent light source with relatively low spatial coherence (e.g., a laser diode) that emits temporally coherent light toward the scene including surface 206.

In some embodiments, the light emitted by a coherent source can be characterized by the underlying electric field U, which varies sinusoidally over time t according to the following:

$$U_S(L,t) = U_s \cos(\omega t + \phi_S(t)), \quad (1)$$

where L is the spatial location of light source 202, S is the spatial location of surface 206, $U_S$ is the amplitude of light emitted toward surface 206 (e.g., $$U_S = \sqrt{L_S},$$

where $L_S$ is the radiant intensity of the source emitted toward the surface 206), and $\phi_S(t)$ is the phase of the light emitted by light source 202. The modulation frequency $$\omega = \frac{2\pi c}{\lambda},$$

where λ is the wavelength of light source 202, and c is the speed of light. Note that although coherent light sources, such as light source 202, are often characterized as having a particular wavelength, coherent light sources typically emit light in a narrow band of wavelengths from $\lambda_{min}$ to $\lambda_{max}$, the wavelength λ is typically the mean wavelength emitted by the coherent light source (e.g., $$\frac{\lambda_{min} - \lambda_{max}}{2}$$

In some embodiments, if surface 206 is assumed to be imaged by bare sensor 204, as shown in FIG. 2A, the electric field at pixel p due to the light reflected from the point S is given as:

$$U_S(p,t) = \alpha(S)U_S \cos\left(\omega t + \phi_S(t) - 2\pi \frac{2\Gamma(S)}{\lambda} + \phi_S^r\right), \quad (2)$$

where α(S) encodes the light attenuation due to reflection at S, and the intensity fall-off due to propagation. The phase of the emitted electric field is shifted by $$2\pi \frac{2\Gamma(S)}{\lambda}$$

during propagation along the path L→S→p, where Γ(S) is the distance of S from the source, and $\phi_S^r$ is the change in phase due to reflection at point S.

In such embodiments, since bare sensor 204 has no focusing optics, we assume that each pixel collects light from every point on surface 206. The total electric field U(p) at pixel p is then given by integrating the fields $U_S(p,t)$ from all scene points over the surface Ψ:

$$U(p,t) = \int_\Psi U_S(p,t) dS = \int_\Psi \beta(S) \cos(\omega t + \hat{\phi}_S(t)) dS, \quad (3)$$

where, $$\beta(S) = \alpha(S)U_S \text{ and } \hat{\phi}_S(t) = \phi_S(t) - 2\pi \frac{2\Gamma(S)}{\lambda} + \phi_S^r.$$

In some embodiments, a speckle image I that represents the measured image brightness due to this electric field can be given as:

$$I(p) = \kappa \int_0^\tau (U(p,t))^2 dt, \quad (4)$$

where τ is the sensor integration time, and κ is a proportionality factor incorporating sensor gain.

Figure 4A:
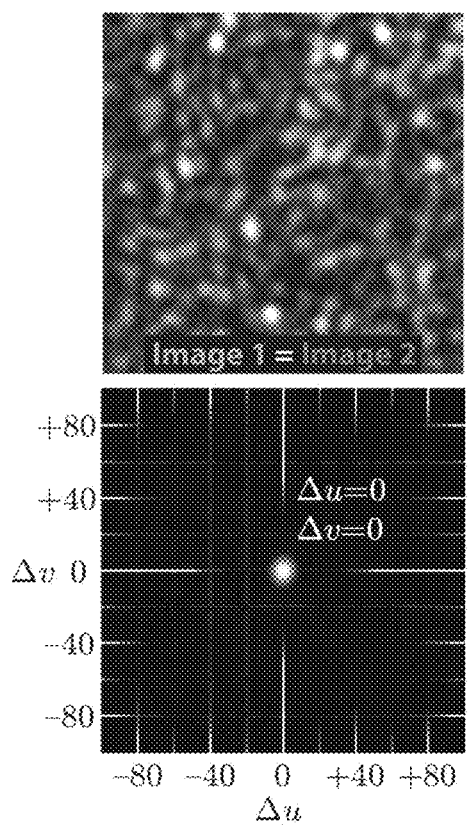
FIGS. 4A and 4B show examples of a result of comparing two speckle images in accordance with some embodiments of the disclosed subject matter.
Figure 4B:
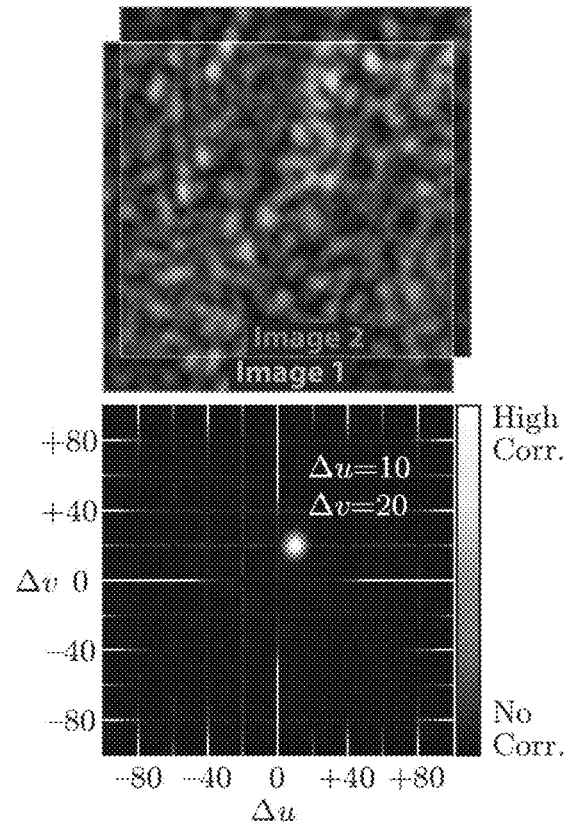

In general, a speckle pattern due to reflection of coherent light from an optically rough surface is statistically random, as each point on the illuminated surface acts as a secondary light source that emits spherical wavefronts. Accordingly, the total light received at a pixel of an image sensor is the superposition of all the wavefronts. The phase of each of these wavefronts varies rapidly as the path-lengths (from scene point to sensor pixel) change due to surface roughness, which can create the statistically random speckle intensity distribution observed by the image sensor (e.g., as shown in FIG. 1). This statistical randomness can manifest as the following two properties observed in speckle images:

$$\boxed{(I * I)(u, v) = \Lambda(u, v)}, \quad (5)$$
Auto-correlation property where I(u, v) is a speckle image, [u, v] are image coordinates, and * is the 2D correlation operator. Λ(u, v)=κδ(u, v) is a scaled dirac-delta function δ(u, v) (e.g., as shown in FIGS. 4A and 4B described below), where κ is the square-norm of the speckle image and can be represented as $\kappa = \Sigma_{u,v}(I(u, v))^2$; and $$\boxed{(I_1 * I_2)(u, v) = 0}, \quad (6)$$
Cross-correlation property where $I_1(u, v)$ and $I_2(u, v)$ are speckle images due to reflection from two different rough surfaces $\Psi_1$ and $\Psi_2$, respectively. In some embodiments, these two properties can lead to the conclusion that speckle images from two different surfaces can be treated as mutually orthogonal random functions (i.e., with high probability, a speckle pattern is uncorrelated with anything but itself).

In general, the mean "size" ζ, of an individual speckle in a speckle image is proportional to the wavelength of light being reflected to create the speckle pattern, and is given as $$\zeta = \frac{\lambda \Gamma}{\Omega},$$

where λ is the wavelength of light, Γ is the distance of the object from the sensor, and Ω is the area of the illuminated pattern. Additionally, speckle size may depend on several other factors, such as imaging geometry, surface properties (e.g., roughness of the surface, a bidirectional reflectance distribution function of the surface, etc.), and sensor properties (e.g., pixel size, aperture, and focal length). For visible or near infrared ("NIR") wavelengths, e.g., ~380-800 nanometers (nm), the speckle size may be limited only by the sensor pixel size, resulting in extremely high spatial frequencies.

In some embodiments, for example as shown in FIG. 2B, an approximately planar surface patch Ψ of surface 206 is illuminated by coherent light source 202. Representing the origin of the coordinate system as a point S on Ψ, the Z-axis is perpendicular to the plane containing Ψ. In such embodiments, the patch undergoing a small six degree of freedom rigid motion can be represented by a translation vector T=[$T_x$, $T_y$, $T_z$]', and a rotation vector R=[$R_x$, $R_y$, $R_z$]', that represent motion along the axes shown in FIG. 2B and rotation about those axes, respectively.

I(u, v) and I'(u, v) can represent two speckle images captured by an image sensor (e.g., bare sensor 204), before and after a motion, respectively. Based on the homology conditions described above, the speckle pattern does not change between the two images, but only gets locally displaced (shifted) between the two images. Thus, the intensity at a pixel I'(u', v') in the image captured after motion is the same as the intensity at a different pixel I(u, v) in the image captured before motion. Assuming a paraxial sensor, the relationship between the speckle image displacement vector [Δu, Δy]=[u'−u, v'−v] and the object motion is given by a linear system of equations:

$$\begin{pmatrix} \Delta u \\ \Delta v \end{pmatrix} = M_{trans}T + M_{rot}R, \quad (7)$$

where $M_{trans}$ and $M_{rot}$ are 2×3 matrices, whose entries depend on the geometric configuration of the scene and the system used to generate and capture the speckle images (e.g., the relative locations of the patch, the properties of the sensor being used, the properties of the light source being used, etc.), as well as radiometric characteristics of the imaging system (e.g., sensor pixel size, wavelength of light, etc.). For example, assuming a set of conditions including: a scene made of infinitesimally small surface patches in which the dominant motion of every patch can be approximated as a translation (e.g., rotations are negligible); a bare sensor (e.g., bare sensor 204); and a light source and principal point of the bare sensor being co-located along the Z-axis; the relationship between image space speckle motion [Δu, Δv] and the object translation in 3D space can be represented as:

$$\begin{pmatrix} \Delta u \\ \Delta v \end{pmatrix} = \begin{pmatrix} \frac{2}{p} & 0 & -\frac{u}{d} \\ 0 & \frac{2}{p} & -\frac{v}{d} \end{pmatrix} \begin{pmatrix} T_x \\ T_y \\ T_z \end{pmatrix}, \quad (8)$$

Figure 3A:
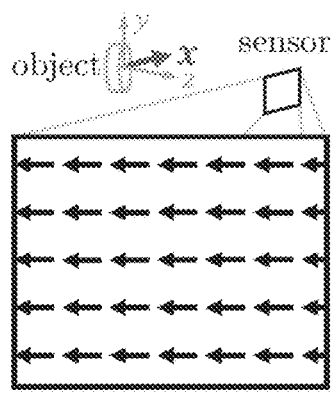
FIGS. 3A to 3C represent a qualitative depiction of speckle motion due to translation along the X-axis, translation along the Y-axis, and translation along the Z-axis toward the sensor in accordance with some embodiments of the disclosed subject matter.
Figure 3B:
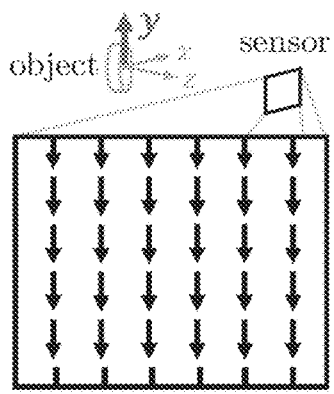
Figure 3C:
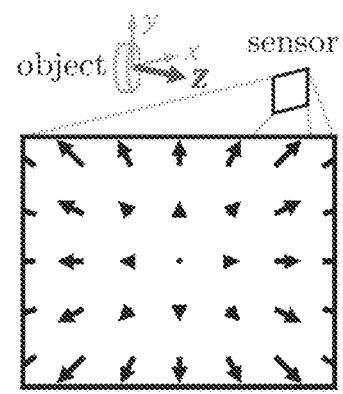

Speckle Motion Model where p is the side length of the sensor pixels (assuming square pixels), and d is the distance between scene point S and the light source. FIGS. 3A to 3C represent a qualitative depiction of speckle motion due to translation along the X-axis, translation along the Y-axis, and translation along the Z-axis toward the sensor in accordance with some embodiments of the disclosed subject matter. From Equation 8 it is clear that lateral object motion ($T_x$ or $T_y$) results in translation of the speckle image, whereas axial object motion ($T_z$) results in radial expansion/contraction of the speckle image around the principal point. Note that although Equation 8 is described in connection with a simplified configuration for ease of explanation, the mechanisms described herein are useful across a variety of geometric configurations.

In another configuration including a conventional pinhole sensor imaging a small planar surface patch located at a distance d along its optical axis, under perspective projection (i.e., conventional imaging), the image motion [$\Delta u_{persp}$, $\Delta v_{persp}$] due to small object translation T=[$T_x$, $T_y$, $T_z$]' can be represented as:

$$\begin{pmatrix} \Delta u_{persp} \\ \Delta v_{persp} \end{pmatrix} = \begin{pmatrix} \frac{f}{dp} & 0 & -\frac{u}{d} \\ 0 & \frac{f}{dp} & -\frac{v}{d} \end{pmatrix} \begin{pmatrix} T_x \\ T_y \\ T_z \end{pmatrix}, \quad (9)$$

where f is the focal length of the sensor. Based on a comparison of Equations 8 and 9, the motion magnification ratio of a sensor being used to capture a speckle pattern in comparison to conventional imaging can be represented by the ratio of the image space motions between speckle and conventional imaging, for a given motion along the three axes X, Y and Z. In some embodiments, for example as described above in connection with FIGS. 2A and 2B, the motion magnification ratio can represent the ability of a bare sensor speckle imaging system to magnify motion, as compared to a conventional perspective imaging system. For example, if the patch 206 moves along the X axis by a unit distance, so that T=[1,0,0]. Then, the motion magnification ratio along the X axis can be represented as:

$$R_X^{motionmag} = \frac{\Delta u}{\Delta u_{persp}} = \frac{\frac{2}{p}}{\frac{f}{dp}} = \frac{2d}{f}, \quad (10)$$

Similarly, for unit motion along the Y axis (e.g., T=[0,1,0]), the motion magnification ratio $R_Y^{motionMag}$ can be represented as:

$$R_Y^{motionmag} = \frac{\Delta v}{\Delta v_{persp}} = \frac{\frac{2}{p}}{\frac{f}{dp}} = \frac{2d}{f}, \quad (11)$$

In a more particular example, a sensor with pixels having a side length p=6 microns (μm), an object motion of 3 μm along the X or Y axes will create a single pixel speckle shift, whereas, for a perspective sensor with focal length f=20 mm, and patch distance d=0.5 meters, a motion of 0.15 mm will create a single pixel motion, resulting in a motion magnification ratio of 50 for lateral motion. As another example, for unit motion along the Z axis (e.g., T=[0,0,1]), the motion magnification ratio $R_Z^{motionMag}$ is given as:

$$R_Z^{motionmag} = \frac{\Delta u}{\Delta u_{persp}} = \frac{\frac{-u}{d}}{\frac{-u}{d}} = 1, \quad (12)$$

which is considerably lower than the motion magnification along X and Y. This lower axial motion sensitivity as compared to the sensitivity for lateral motion has limited previous attempts to use speckle-based motion analysis for both object motion and sensor ego-motion to a relatively limited axial motion resolution (e.g., ~1-2 cm).

However, as described below, although it is difficult to achieve high precision by locally measuring speckle movement due to axial object motion, a global scale-space analysis of the entire speckle image can lead to high motion sensitivity, along all three axes. For example, by exploiting the auto-correlation property of speckle images as described above in connection with Equation 5, small axial motion (e.g., on the order of <100 μm) can be measured, in addition to achieving high lateral motion sensitivity (e.g., on the order of <5 μm). As described below, the mechanisms described herein can compute simple image correlations to determine motion of objects represented in a speckle image, an operation with relatively low computational complexity.

In some embodiments, in a simplified example in which a single object is translating laterally (i.e., parallel to the sensor, or X-Y, plane), the object motion between two successive speckle images I and I' can be represented by the translation vector T=[$T_x$, $T_y$, 0]'. Using Equation 8, the resulting speckle motion can be represented by the speckle flow vector $$[\Delta u, \Delta v] = \frac{2}{p}[T_x, T_y].$$

As described above, the speckle in the image moves with the relative motion of the object and is constant over the entire image (i.e., not a function of u and v) in a defocused imaging system (e.g., using bare sensor 204). In some embodiments, if the scene is imaged with less defocus, the above relationship can also depend on the focal length of the optics used to focus the image, but may still be independent of u and v. From this, it follows that I' is a spatially shifted (translated) version of I, and due to the auto-correlation property of speckle images (e.g., as described above in connection with Equation 5), the 2D cross-correlation image $I^{corr}$=I*I' can be approximated as a shifted delta function, centered at [Δu, Δv], which can be represented as:

$$I^{corr}(u,v)I*I'=\Lambda(u-\Delta u,v-\Delta y). \quad (13)$$

FIGS. 4A and 4B show examples of a result of comparing two speckle images in accordance with some embodiments of the disclosed subject matter. As shown in FIG. 4A, a correlation between two speckle images in which there is no substantial lateral motion shows a delta function at the origin, indicating a lack of lateral motion between the two speckle images. In FIG. 4B, a correlation between two speckle images in which there is lateral motion along both the X and Y axes shows a delta function displaced from the origin in both the X and Y directions, indicating the amount of lateral motion between the two images. In a more particular example, given a pixel size p=6 μm, a small object motion of 3 μm will result in the peak location getting shifted by 1 pixel. Thus, given pixel size p, we can estimate the scene motion ($T_x$, $T_y$) by finding the peak location (Δu, Δv) in the cross-correlation image $I^{corr}$(t, v).

In some embodiments, considering an object translating axially (i.e., parallel to Z-axis), motion between two successive speckle images I and I' can be represented by a vector T=[0,0,$T_x$]'. Using Equation 8, the resulting speckle motion can be represented by the vector $$[\Delta u, \Delta v] = \left[\frac{-u}{d}T_z, \frac{-v}{d}T_z\right],$$

where d is the distance of the object from the sensor in the first image. This speckle motion vector can specify a radial scaling (expansion/contraction) of the speckle image, such that $I_\chi^{scale}$(u, v) can represent a scaled version of an image I(u, v), around its principal point [$c_u$, $c_v$]:

$$I_\chi^{scale}(u,v)=I(u+\chi(u-c_u),v+\chi(v-c_v)), \quad (14)$$

where χ is the scale. Accordingly, in such an example, the speckle image I' after axial object motion can be represented as a scaled version of the original speckle image I:

$$I'=I_\chi^{scale}, \quad (15)$$

where the scale factor χ is given as $$\chi = \frac{T_z}{d}$$

(because the speckle motion vector $$[\Delta u, \Delta v] = \frac{T_z}{d}[-u, -v],$$

as discussed above). Thus, given scene depth d, we can estimate axial motion $T_z$ by measuring the scale factor χ between I' and I. In some embodiments, if scene depths, d, are unknown, but the range of depths over which $T_z$ is being measured are small relative to d, (e.g., d>>$d_{max}$−$d_{min}$), then, the $$\frac{1}{d}$$

factor from can be considered approximately constant, and the axial motion can be recovered up to a constant multiplicative factor.

In some embodiments, the scale factor can be estimated by comparing I' with differently versions of I scaled by different amounts. In the following example, the correct scale is represented by $\hat{\chi}$, so that $I'=I_{\hat{\chi}}^{scale}$. In order to determine $\hat{\chi}$, a 1D search can be performed over a range of $\chi$ (e.g., $\chi=-0.20, -0.19, \ldots, 0.20$). For each candidate $\chi$, a 2D cross-correlation of I' with the scaled version $I_\chi^{scale}$ can be performed as represented by:

$$I_\chi^{corr} = I_\chi^{scale} * I', \qquad (16)$$

Due to the auto-correlation property of speckle (as represented by Equation 5 described above), the correlation image $I_\chi^{corr}$ corresponding to the correct scale is the correlation that produces the highest peak (e.g., a distribution that is most similar to a delta function). Thus, $\hat{\chi}$ can be estimated by creating a stack of $I_\chi^{corr}$ images, and finding the image that has the highest peak:

$$\hat{\chi} = \underset{\chi}{\arg\max}\, peakVal(I_\chi^{corr}), \qquad (17)$$

where peakVal($I_\chi^{corr}$) operator returns the height of the peak in image $I_\chi^{corr}$. In some embodiments, motion measurement using techniques based on the scale-space analysis described above can measure axial motions with precision on the order of <100 microns.

In some embodiments, motion of an object undergoing compound translation (e.g., simultaneous lateral and axial motion), can be represented by a translation vector $T=[T_x, T_y, T_z]'$, and can be recovered by building upon the lateral and axial motion estimation techniques described above. For example, as described below in connection with FIG. 10, a stack of 2D cross-correlation images $I_\chi^{corr}$ can be created, and from this stack, the image that has the highest peak can be used to determine the correct image scale $\chi$, and the location of the highest peak location (e.g., ($\Delta u$, $\Delta v$)). Using these techniques, the object translation vector can be recovered as:

$$T_x = \frac{p}{2}\Delta u,\ T_y = \frac{p}{2}\Delta v,\ T_z = d\hat{\chi}, \qquad (18)$$

The precision of the motion measurement techniques described above can depend on how accurately the local maxima can be located in the stack of scale-space cross-correlation images, which can be determine using any suitable technique or combination of techniques. For example, a maximum filter can be applied over the 3-dimensional stack and values that match the maximum filter output can be selected. This produces a set of 3D pixel coordinates that correspond to local maxima (e.g., as shown in FIG. 5B, described below). In such an example, the resolution of this simple approach is limited to one pixel for lateral motion, and to $\Delta\chi$, the difference between consecutive scale values, for axial motion.

Figure 5A:
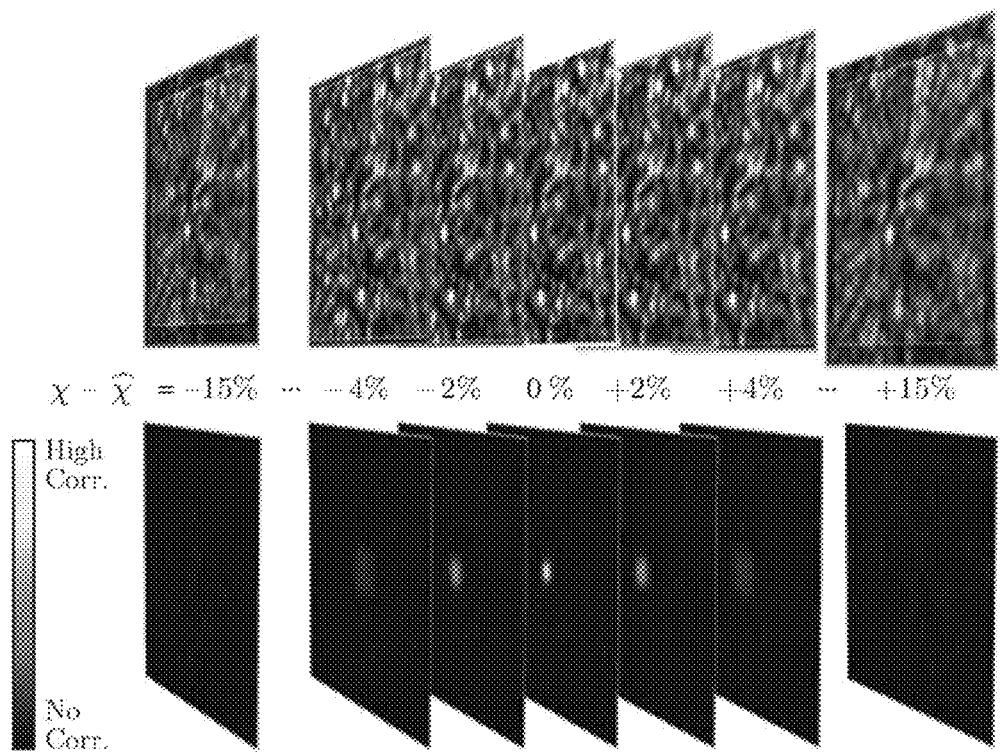
FIGS. 5A to 5C show examples of scaling an initial image and cross-correlating the scaled images with a second image to find the motion between the two images in accordance with some embodiments of the disclosed subject matter.
Figure 5B:
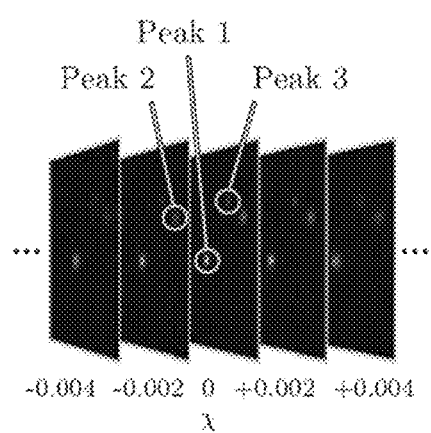
Figure 5C:
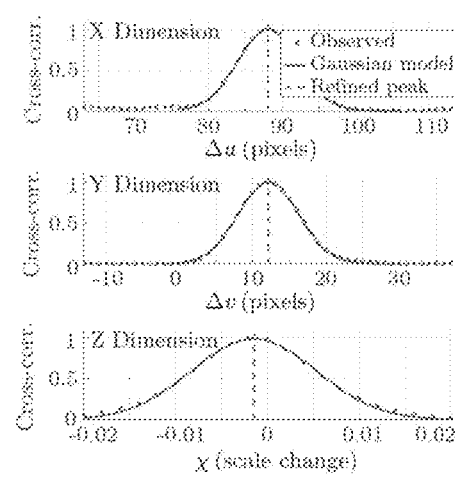

As another example, peaks may exhibit a Gaussian-like profile (e.g., as shown in FIG. 5C described below), and a Gaussian model can be fitted to each peak, the centroid of which can give a refined sub-pixel and sub-scale location. In such an example, using a Gaussian model may not significantly increase precision when determining $\Delta u$ and $\Delta v$ coordinates due to the large lateral motion magnification ratio, but may substantially improve precision and/or reduce the use of computing resources when determining axial motion, as sensitivity to axial motion is much lower than sensitivity to lateral motion, and computing cross-correlation images across fine scale increments becomes expensive. Accordingly, a 1D Gaussian model can be fitted across the scale dimension of each initial peak to refine the scale (i.e., $\chi$) coordinate. Using these techniques can facilitate relatively precise determinations of movement along the axial direction with reduced size of the scale-space search by increasing the scale increment, while avoiding fitting a more complicated 3D Gaussian model.

FIGS. 5A to 5C show examples of scaling an initial image and cross-correlating the scaled images with a second image to find the motion between the two images in accordance with some embodiments of the disclosed subject matter. As shown in FIG. 5A, the initial image I can be scaled at various levels of contraction and expansion, and a cross-correlation of the scaled image with the subsequent image I' can generate information that can be used to select the correct scale and determine any lateral translation between the two images. FIG. 5B shows an example of a set of cross-correlations at various scales of the initial image I, and FIG. 5C shows cross-correlation values for a peak from FIG. 5B fitted to Gaussian models.

In some embodiments, the cross-correlation can be performed using the cross-correlation theorem, which can be represented as:

$$f*g = F^{-1}(conj(F(f)) \cdot F(g)), \qquad (19)$$

where f and g are functions (e.g., $f=I_1$ and $g=I_2$), F is the Fourier transform, $F^{-1}$ is the inverse Fourier transform, conj is the complex conjugate, and · denotes element-wise multiplication. In general, F and $F^{-1}$ can be computed in O(n log n), where n is the number of pixels, via the 2D fast Fourier transform (FFT) algorithm, which can be computed efficiently using a graphics processing unit (GPU).

In some embodiments, a scene can be modeled as a collection of multiple independently moving objects, such that the inter-object distance is large as compared to the size of the objects, with each individual object assumed to be moving rigidly. Various techniques can be used to recover motion of multiple independently moving objects. For example, the multiple objects can be separated spatially in the captured image by using a lens-based imaging system, in which the amount of lens defocus is lower than the inter-object distance in order to ensure that images of different objects are spatially separated. However, as described above, the motion sensitivity of a speckle imaging system is directly proportional to the amount of defocus, which results in a tradeoff between spatial resolution and motion sensitivity. On one extreme, if the sensor is focused on the scene, separating the different objects is relatively simple, but the motion sensitivity is low. On the other extreme, using a bare sensor (extreme defocus) can lead to high motion sensitivity, but the light reflected from all scene objects overlaps, making the rigid body motion estimation techniques described above impossible.

In some embodiments, the speckle in an image formed by capturing overlapping speckle patterns of two optically rough objects $\Psi_1$ and $\Psi_2$ being illuminated by a coherent light source (e.g., light source 202) and imaged by a bare sensor (e.g., bare sensor 204) can be described as a total speckle image $I_{tot}$ due to light reflected from both the objects can be represented by:

$$I_{tot}(p) = \kappa \int_0^\tau (\int_{\Psi_1\Psi_2} \beta(S)\cos(\omega t + \hat{\phi}_S(t))dS)^2 dt, \qquad (20)$$

note that the inner integral is over scene points in both objects $\Psi_1$ and $\Psi_2$. Expanding the inner integral, and re-arranging the terms, the above equation can be written as:

$$I_{tot}(p) = \underbrace{I_1(p)}_{\text{Speckle due to }\Psi_1} + \underbrace{I_2(p)}_{\text{Speckle due to }\Psi_2} + \underbrace{I_{cross}(p)}_{\text{Cross speckle term}}, \quad (21)$$

where $I_i(p)=\kappa\int_0^\tau (\int_{\Psi_i}\beta(S)\cos(\omega t+\hat{\phi}_S(t))dS)^2 dt$ is the speckle image that the sensor would capture if it observed only the object $\Psi_i$, $i\in[1,2]$. The cross term $I_{cross}(p)$ can be represented as:

$$I_{cross}(P)=2\kappa\int_0^\tau (\iint_{\Psi_1\Psi_2}\beta_1\beta_2 c_1 c_2 dS_1 dS_2)^2 dt, \quad (22)$$

where, $\beta_i=\beta(S_i)$, and $c_i=\cos(\omega t+\hat{\phi}S_i(t))$, $i\in[1,2]$. In such embodiments, $I_{cross}$ is the component of the total speckle image $I_{tot}(p)$ due to interference between light reflected from $\Psi_1$ and $\Psi_2$. $I_{cross}$ depends not only on the absolute motion of the individual objects, but also their relative motion and location. Consequently, $I_{cross}$ does not follow the homology conditions for rigid motion of a single object, and Equation 8 cannot be used to determine the motion represented in speckle image $I_{tot}$.

However, $I_{cross}$ becomes negligible if the light source has high temporal coherence, but low spatial coherence, where the degree of spatial coherence of a light source can be specified in terms of its coherence area AC, which is defined as the area of a surface perpendicular to the direction of propagation (at a given distance from the source), over which the emitted light remains coherent with itself. For example, considering two scene points $S_1$ and $S_2$, if $\phi_{S_1}(t)$ and $\phi_{S_2}(t)$ are the phases of light emitted towards them (as described above in connection with Equation 1). If $S_1$ and $S_2$ lie within the coherence area of the light source, then the relative phase is fixed over time, i.e., $\phi_{S_1}(t)-\phi_{S_2}(t)=\phi_{12}$. As a result, light reflected from these two points will interfere, creating a cross term $I_{cross}$ in the speckle pattern. However, if the distance between the points is more than the diameter of the coherence area, the phases $\phi_{S_1}(t)$ and $\phi_{S_2}(t)$ fluctuate randomly with respect to each other, and the cross term $I_{cross}$, which contains a time integral of the product of cosines of the two phases, vanishes over time. That is, the light reflected from these two points does not interfere, and the total image, $I_{tot}$, is the sum of the intensities, similar to incoherent light. In this example, $I_{tot}(p)=I_1(p)+I_2(p)$, i.e., the total speckle image is simply the sum of both individual speckle images.

In general, multi-object motion analysis techniques can be broadly classified into two categories: techniques that track locations of individual objects over time; and techniques which do not explicitly compute the 3D structure of the scene or track individual points. For example, most camera-based hand tracking and gesture recognition systems explicitly estimate a hand's pose and skeletal structure, and are examples of the first type of motion analysis technique. Tracking individual spatio-temporal trajectories of individual objects can provide highly detailed motion information but is not always possible if objects lack texture or if the motions are small. The mechanisms described herein are generally the second type of technique for analyzing the motion of multiple objects. Other examples of the second type of technique can include techniques based on alternative sensing modalities such as millimeter-wave radar, or radio waves that recognize hand gestures by performing aggregate motion analysis of the entire scene over time. However, these other examples achieve limited motion sensitivity and/or require expensive special purpose hardware.

In some embodiments, various light sources can be used to create light with relatively high temporal coherence and relatively low spatial coherence that can cause the cross term to be negligible with respect to the intensities, while other light sources may not have appropriate characteristics. For example, light sources with a coherence area that is sufficiently large so that individual objects create a speckle pattern, but sufficiently small so that light reflected from different objects does not interfere can be used to create the speckle pattern. In a more particular example, the light source can be a narrow-band filter in front of a white-light source (e.g., a halogen lamp). As another more particular example, the light source can be a laser diode. Some light sources may not be suitable for use with the mechanisms described herein for estimating motion of multiple objects. For example, mode-locked lasers typically have high spatial coherence and a large coherent area. Consequently, if such a laser were used to illuminate the scene, the cross term may not vanish even for two distant objects. As another example, the coherence area of white light sources (e.g., a halogen lamp) may be too small to create a speckle pattern at all.

Figure 6:
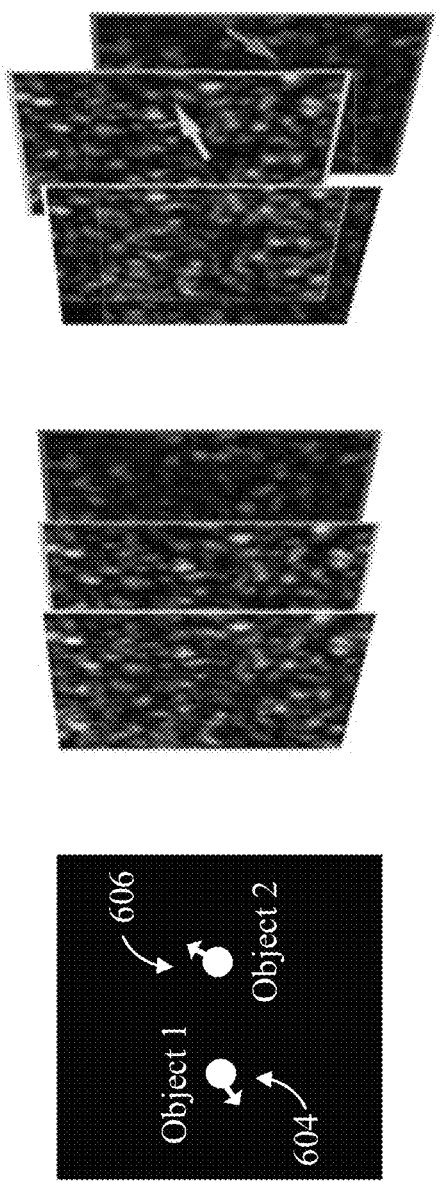
FIG. 6 shows an example of speckle patterns created by two independently moving objects in a scene and cross-correlations calculated based on the speckle patterns of a first speckle image and a second speckle image in accordance with some embodiments of the disclosed subject matter.
Figure 6:
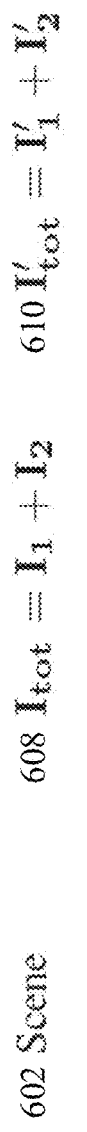
Figure 6:
Figure 6:
Figure 6:
Figure 6:

FIG. 6 shows an example of speckle patterns created by two independently moving objects in a scene and cross-correlations calculated based on the speckle patterns of a first speckle image and a second speckle image in accordance with some embodiments of the disclosed subject matter. As shown in FIG. 6, a scene 602 includes a first object 604 and a second object 606 moving independently. A first speckle image 608 ($I_{tot}$) captured of scene 602 includes contributions from both the first object (speckle image $I_1$ if only the first object were in the scene) and the second object (speckle image $I_2$ if only the second object were in the scene). A second speckle image 610 (speckle image $I_{tot}'$) captured of scene 602 after object 604 and object 606 have moved as indicated includes contributions from the first object (speckle image if only the first object were in the scene) and the second object (speckle image $I_2'$ if only the second object were in the scene). Note that $I_1'$ and $I_2'$ show the speckle images $I_1$ and $I_2$ shifted due to movement of the objects, and $I_{tot}'$ shows only the portions that correspond to speckle included in $I_{tot}$, however, this is shown for ease of explanation and there would be speckle pattern present from each object that was not included in $I_{tot}$. That is, the speckle from object 1 and object 2 would each fill the entirety of the sensor, as shown in image 608.

As shown in FIG. 6, a result of a cross-correlation between $I_1$ and the portion of $I_{tot}'$ generated from object 604 (i.e., the portion of $I_1'$ as shown that falls within $I_{tot}'$) is shown in 612, with a peak 614 indicating the amount by which $I_1$ can be shifted to most closely match the portion of $I_{tot}'$ created by object 604 based on the cross-correlation 612. Similarly, a result of a cross-correlation between 12 and the portion of $I_{tot}'$ generated from object 606 (i.e., the portion of $I_2'$ as shown that falls within $I_{tot}'$) is shown in 616, with a peak 618 indicating the amount by which 12 can be shifted to most closely match the portion of $I_{tot}'$ created by object 606 based on the cross-correlation 616. A result of a cross-correlation between $I_{tot}$ and $I_{tot}'$ is shown in 620, with peak 614 indicating the amount by which $I_1$ can be shifted to most closely match the portion of $I_{tot}'$ created by object 604 based on the cross-correlation 620, and peak 618 indicating the amount by which $I_2$ can be shifted to most closely match the portion of $I_{tot}'$ created by object 606 based on the cross-correlation 620. Note that adding the results of the individual cross-correlations together produces similar results to the cross-correlation of the total images, although in most situations the individual speckle images produced by each object are not available as shown in FIG. 6 (i.e., only the total image is typically available for determining object motions).

As described above, the cross term in the speckle pattern due to two independently moving objects $\Psi_1$ (e.g., object 604) and $\Psi_2$ (e.g., object 606) can be eliminated by using a light source with low spatial coherence. However, the total speckle image still consists of two speckle components, each moving independently, as shown in FIG. 6. If the total speckle image, before and after the motion of objects is represented by:

$$I_{tot}(p) = I_1(p) + I_2(p)$$

$$I_{tot}'(p) = I_1'(p) + I_2'(p)'$$

where $I_i(p)$ and $I_i'(p)$ are the speckle patterns before and after motion, due to the individual patch $\Psi_i$, $i \in [1,2]$, the speckle motion model described above in connection with FIGS. 2A to 3C directly on the total speckle images $I_{tot}$ and $I_{tot}'$ because multiple speckle flows are super-imposed in these images. One potential approach would be to separate $I_{tot}$ and $I_{tot}'$ into individual components. However, this may not be feasible without sophisticated blind source separation algorithms. However, although the speckle patterns cannot be easily separated, their motion can be separated by exploiting the cross-correlation property of speckle patterns (e.g., as described above in connection with Equation 6). Specifically, the correlation of the speckle images $I_{tot}$ and $I_{tot}'$ can be calculated as:

$$I_{tot}^{corr} = I_{tot} * I_{tot}' = (I_1 + I_2) * (I_1' + I_2')$$

$$= I_1 * I_1' + I_2 * I_2' + I_1 * I_2' + I_2 * I_1''$$

where the image indices u and v have been omitted. According to the cross-correlation property of speckle patterns, the correlation between speckle patterns from two different optically rough surfaces is zero. Accordingly the terms $I_1 * I_2' = I_2 * I_1' = 0$ and, and the above relationship can be simplified as:

$$I_{tot}^{corr} = I_1^{corr} + I_2^{corr}, \quad (23)$$

where $I_i^{corr} = I_i * I_i'$ represents the correlation image due to the motion of object $\Psi_i$, imaged individually. In general, if K independently moving objects are imaged simultaneously, we get:

$$\boxed{I_{tot}^{corr} = \sum_{i=1}^{K} I_i^{corr}} \quad (24)$$

*Multi-Object Speckle Correlation*

Note that, under the certain assumptions (e.g., small objects moving independently, illuminated by a light source with low spatial coherence), the speckle correlation image due to multiple objects moving simultaneously is the sum of the correlation images due to the motion of objects imaged individually. Accordingly, because each individual correlation image can be approximated as a shifted delta function (with the shift corresponding to the motion of that object, as described above in connection with FIGS. 4A to 5C), the total correlation image is a sum of the shifted delta functions, as shown in cross-correlation 620 in FIG. 6. Each peak corresponds to the motion of a single object, and can be isolated relatively easily.

Figure 7:
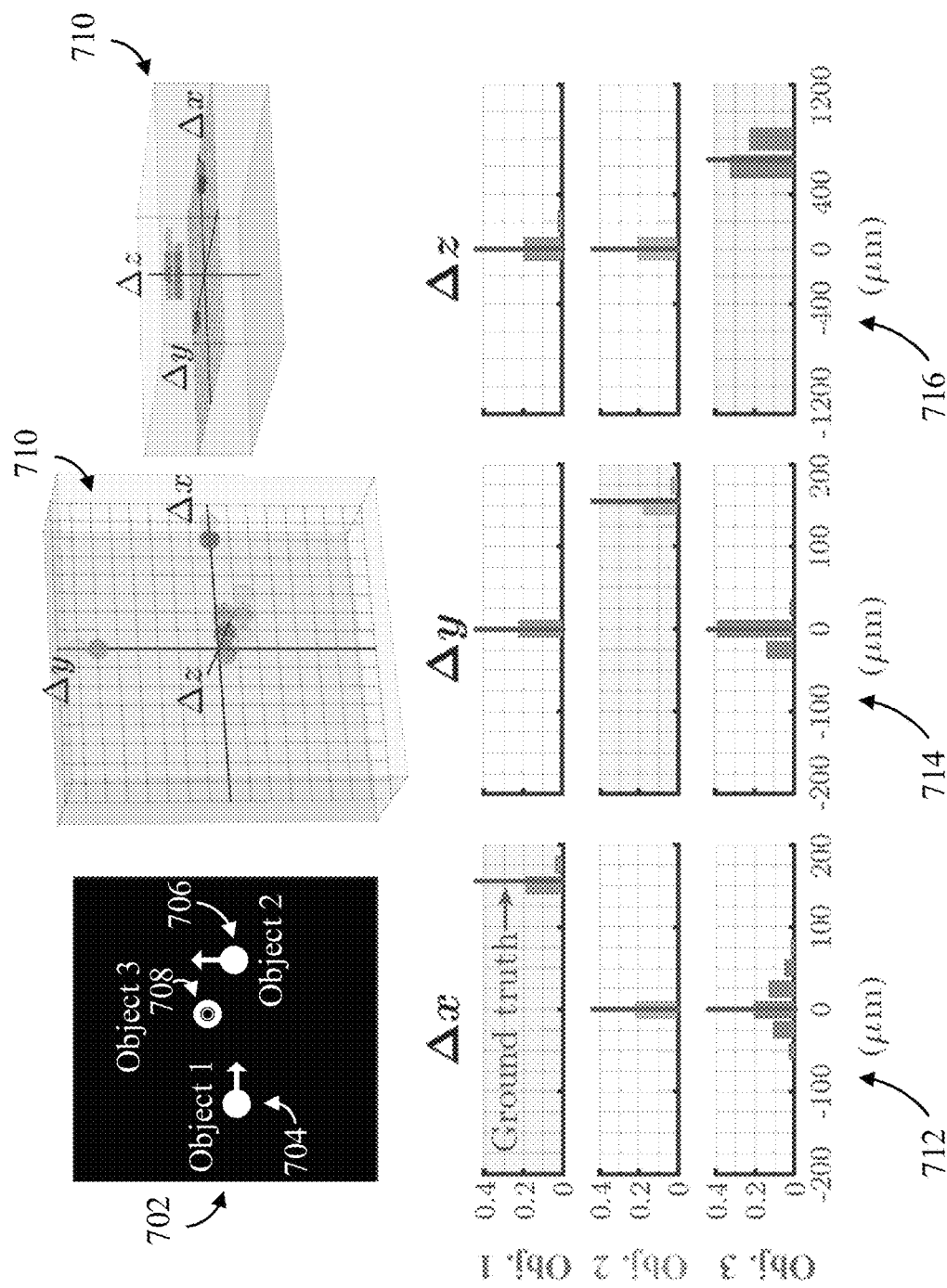
FIG. 7 shows an example of three independently moving objects, a 3D histogram showing object motions, and histograms showing motion across each of the three axes in accordance with some embodiments of the disclosed subject matter.

In some embodiments, the 3D object motion estimation techniques described in connection with FIGS. 5A-5C can be applied to multiple peaks in the cross-correlation between two speckle images corresponding to multiple objects, to create a 3D motion histogram of the scene, where a non-zero bin value corresponds to the 3D motion of an object. For example, FIG. 7 shows an example of three independently moving objects, a 3D histogram showing object motions, and histograms showing motion across each of the three axes in accordance with some embodiments of the disclosed subject matter. As shown in FIG. 7, a scene 702 includes a first object 704 moving along the x-axis from left to right in scene 702, a second object 706 moving along the y-axis from bottom to top in scene 702, and a third object 708 moving along the z-axis toward the image sensor in 702. FIG. 7 shows a 3D histogram 710 from two angles, with points in the histogram representing estimated motion between successive pairs of speckle images captured of scene 702, while histograms 712, 714 and 716 each represent 1D histograms showing the estimated motion of the three objects along each axis. Note that objects 704-708 were moving at relatively constant speeds, and this is reflected in the estimated motion shown in the histograms. Note that, although the motions in FIG. 7 can be easily attributed to individual objects, this is merely shown for the purposes of explanation, and using a bare sensor and the techniques described herein, the motion of individual objects in the scene cannot easily be attributed to peaks in the cross-correlation without additional processing and/or additional data (e.g., from another sensor). Additionally, due to the cross-correlation producing peaks corresponding to the motion of an object in the scene, if two objects were moving in the same direction at the same speed, the cross-correlation would produce very similar peaks that would likely be indistinguishable. However, this scenario is unlikely in most situations as the objects are unlikely to be moving with precision greater than the motion sensitivity of the scene along all three axes. While the 3D motion histogram (e.g., histogram 710) represents only the aggregate scene motion across time, and cannot be used to track individual objects, it can be used to characterize multi-object 3D motion of a scene, and can be indicative of the dynamic scene configuration. For example, as described below in connection with FIGS. 11-13, the motion histogram can be used as the basis for a hand gesture recognition system.

Note that, although the mathematical model described herein assumes that the scene is made up of small and distant objects, in general, objects may have a finite spatial extent and inter-object distance may be small (e.g., fingers while performing a gesture). Using the mechanisms described herein, motion in such a scene can be estimated, but the precision may be reduced as compared to an idealized system, and such scenes may produce a non-zero cross term in the speckle image due to interference between the speckle generated by different objects. However, if a light source with a relatively narrow bandwidth and a relatively small coherence area is used (e.g., a laser diode with a coherence area of less than about 1 mm, and a bandwidth of about 10 nm), the cross term may remain negligible and the speckle contrast may be sufficiently high to enable relatively precise multi-object motion analysis of the scene.

Figure 8:
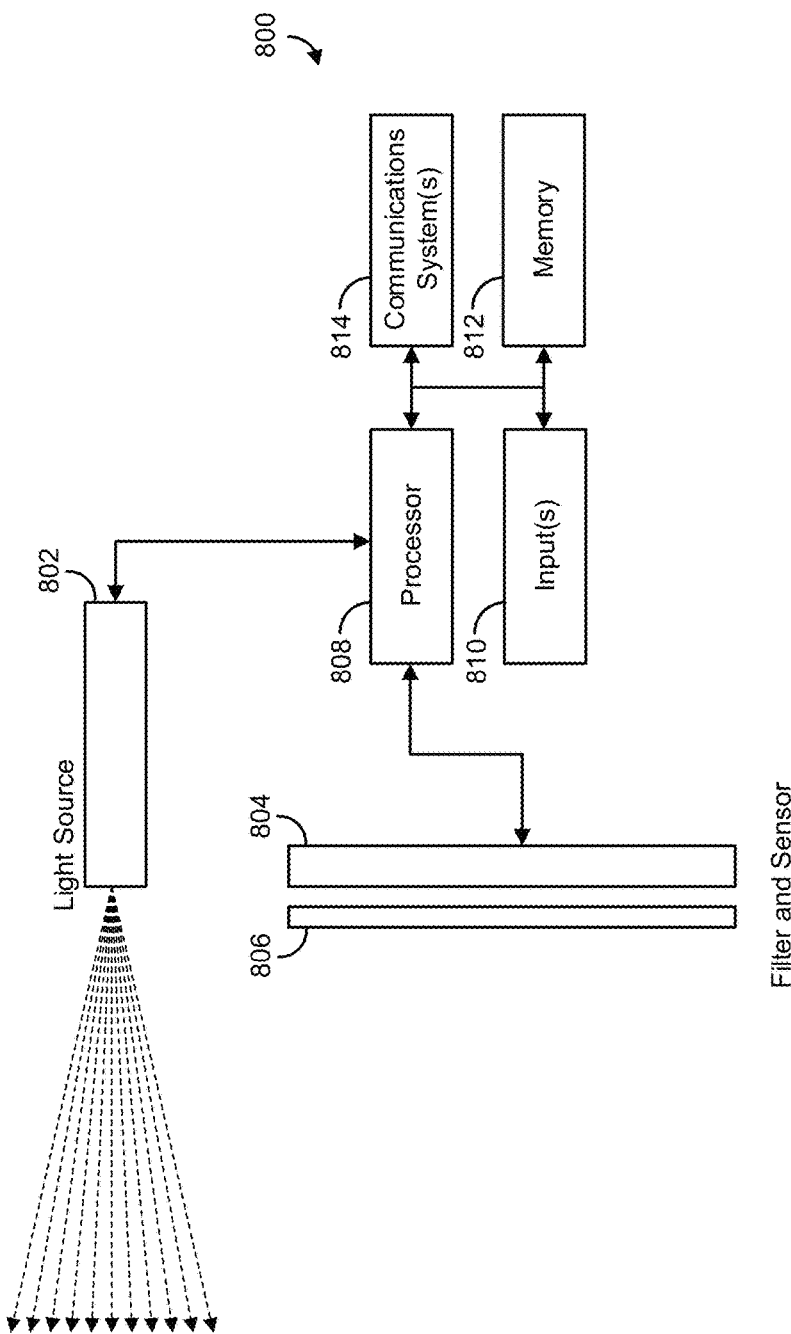
FIG. 8 shows an example of a system for determining object motion in three dimensions using speckle images in accordance with some embodiments of the disclosed subject matter.

Turning to FIG. 8, an example 800 of a system for determining object motion in three dimensions using speckle images is shown in accordance with some embodiments of the disclosed subject matter. As shown, system 800 can include a light source 802; an image sensor 804; a filter 806; a processor 808 for controlling operations of system 800 which can include any suitable hardware processor (which can be a microprocessor, digital signal processor, a microcontroller, a GPU, etc.) or combination of hardware processors; an input device 810 (such as a shutter button, a menu button, a microphone, a touchscreen, a motion sensor, a etc., or any suitable combination thereof) for accepting input from a user and/or from the environment; memory 812; and a communication system or systems 814 for allowing communication between processor 808 and other devices, such as a smartphone, a wearable computer, a tablet computer, a laptop computer, a personal computer, a server, etc., via a communication link. In some embodiments, memory 812 can store speckle images, results of cross-correlations between speckle images, data that can be used to create a 3D histogram, etc. Memory 812 can include a storage device (e.g., a hard disk, a Blu-ray disc, a Digital Video Disk, RAM, ROM, EEPROM, etc.) for storing a computer program for controlling processor 808. In some embodiments, memory 812 can include instructions for causing processor 808 to execute processes associated with the mechanisms described herein, such as processes described below in connection with FIGS. 9-11.

In some embodiments, light source 802 can be any suitable light source that produces light that has relatively high temporal coherence and relatively low spatial coherence, for example, as described above in connection with FIGS. 2 and 5. For example, light source 802 can include a laser diode, a white light source (e.g., a halogen bulb) and a narrow band filter, a laser that is defocused using a concave lens, and/or any other suitable light source. In some embodiments, light source 802 can emit light at any suitable wavelength. For example, light source 802 can emit visible light, near-infrared light, infrared light, etc. In a more particular example, light source 802 can emit temporally coherent light with a center wavelength (i.e., $\lambda$) that is in a range that typically is not visible to humans (e.g., from 700 nm to 1200 nm) but can be detected by conventional silicon-based image sensors (e.g., CMOS sensors, CCD sensors, etc.). In another more particular example, light source 802 can emit temporally coherent light with a center wavelength (i.e., $\lambda$) that is in the infrared range (e.g., above 1200 nm) that may require image sensors based on other semi-conductors (e.g., Indium Gallium Arsnide-based sensors). In yet another more particular example, light source 802 can be a laser centered around 532 nm that is defocused using a concave lens to create light that is temporal coherent, but has low spatial coherence.

In some embodiments, image sensor 804 can be any suitable image sensor that can generate an image of the speckle reflected from the scene. In some embodiments, image sensor 804 can be a bare image sensor without any color filters (e.g., a monochrome sensor, an IR sensor, etc.). In some embodiments, image sensor 804 can be a high speed image sensor that is configured to capture images at a frame rate substantially higher than thirty frames per second. For example, the frame rate can be at least 250 frames per second. In some embodiments, image sensor 804 can be a color sensor, which may reduce the amount of information captured in an image due to the coherent nature of the light that makes up the speckle pattern. In a particular example, the image sensor can be an image sensor included in the Grasshopper 3 camera (e.g., an IMX174 CMOS image sensor available from Sony Corp.) available from FLIR Integrated Imaging Solutions, Inc. (formerly Point Grey Research) with a resolution of 1920×1200 pixels, which the side of each pixel, p=5.62 μm.

In some embodiments, filter 806 can be any suitable filter or combination of filters that permit light emitted by light source 802 and reflected by objects in the scene to impinge on image sensor 804, while reducing the amount of ambient light from the scene that impinges on image sensor 804. For example, filter 806 can be a narrow band pass filter centered around the wavelength (e.g., the mean wavelength) at which light source 802 emits coherent light. In a more particular example, if light source 802 is the 532 nm laser described above, filter 806 can be a bandpass filter centered around 532 nm (±2 nm).

In some embodiments, system 800 can include additional optics. For example, a beam splitter can be used in system 800 such that light is emitted from light source 802 along the same optical path as light received by image sensor 804 (i.e., light source 802 and image sensor 804 can act as though they are collocated). As another example, although image sensor 802 is generally described herein as being a bare sensor, optics can be used to provide defocus of the image while narrowing the field of view of image sensor 802. As yet another example, optics that can change between a focused and defocused state can be used in system 800 to facilitate alternately capturing images of objects in the scene, and speckle images. In a more particular example, an electrowetting lens, and/or other controllable optics, can be used to provide a focused image to the image sensor at a first time, and a defocused speckle image at a second time.

In some embodiments, system 800 can communicate with a remote device over a network using communication system(s) 814 and a communication link. Additionally or alternatively, system 800 can be included as part of another device, such as a smartphone, a tablet computer, a laptop computer, etc. Parts of system 800 can be shared with a device within which system 800 is integrated. For example, if system 800 is integrated with a smartphone, processor 808 can be a processor of the smartphone and can be used to control operation of system 800.

In some embodiments, system 800 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 814 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 800 and another device, such as a network link, a dial-up link, a wireless link, a hard-wired link, any other suitable communication link, or any suitable combination of such links. System 800 and/or another device (e.g., a server, a personal computer, a smartphone, etc.) can enable a user to execute a computer program uses information derived using the mechanisms described herein to, for example, control a user interface.

It should also be noted that data received through the communication link or any other communication link(s) can be received from any suitable source. In some embodiments, processor 808 can send and receive data through the communication link or any other communication link(s) using, for example, a transmitter, receiver, transmitter/receiver, transceiver, or any other suitable communication device.

Figure 9:
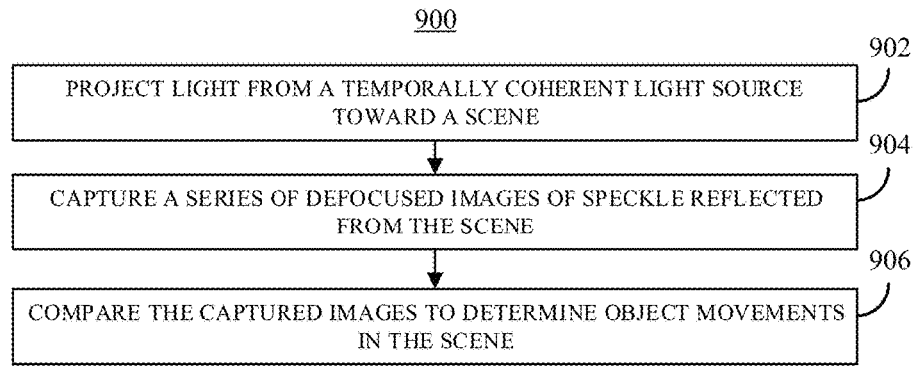
FIG. 9 shows an example of a process for determining motion of objects in a scene in accordance with some embodiments of the disclosed subject matter.

FIG. 9 shows an example 900 of a process for determining motion of objects in a scene in accordance with some embodiments of the disclosed subject matter. As shown in FIG. 9, process 900 can start at 902 by causing light to be projected by a temporally coherent light source (e.g., light source 802) toward a scene for which motion is to be determined. As described above (e.g., in connection with FIGS. 2A, 2B and 8), the light source can be any suitable light source that emits light that is temporally coherent, but that has relatively low spatial coherence. In some embodiments, process 900 can cause the light to be emitted by the light source continuously or intermittently while images are to be captured.

At 904, process 900 can cause an image sensor (e.g., image sensor 804) to capture a series of defocused images of speckle patterns reflected from the scene. As described above in connection with FIG. 8, the image sensor can capture images of the scene at any suitable frame rate. In some embodiments, the captured speckle images can be stored in any suitable memory (e.g., memory 812). As described above in connection with FIGS. 5A-5C, the amount of defocus with which the speckle image is captured can be proportional to the sensitivity of motion estimates that can be made using the images.

At 906, process 900 can compare two of the captured speckle images to determine object movements in the scene based on shifts in the speckle included in the images. In some embodiments, process 900 can use any suitable technique or combination of techniques to determine object motions in the scene based on the two images. For example, as described above in connection with FIGS. 5A-5C and 6 and below in connection with FIG. 10, process 900 can create versions of one of the images (e.g., an image that was captured first) at various scales, and can compare these versions to the other image by performing a 2D cross-correlation. The result of the cross-correlations at various scales can be evaluated to determine movement of an object in an axial direction from the cross-correlation that produced the largest peak, and can determine lateral motion of the object based on the location of a peak resulting from the cross-correlation.

Figure 10:
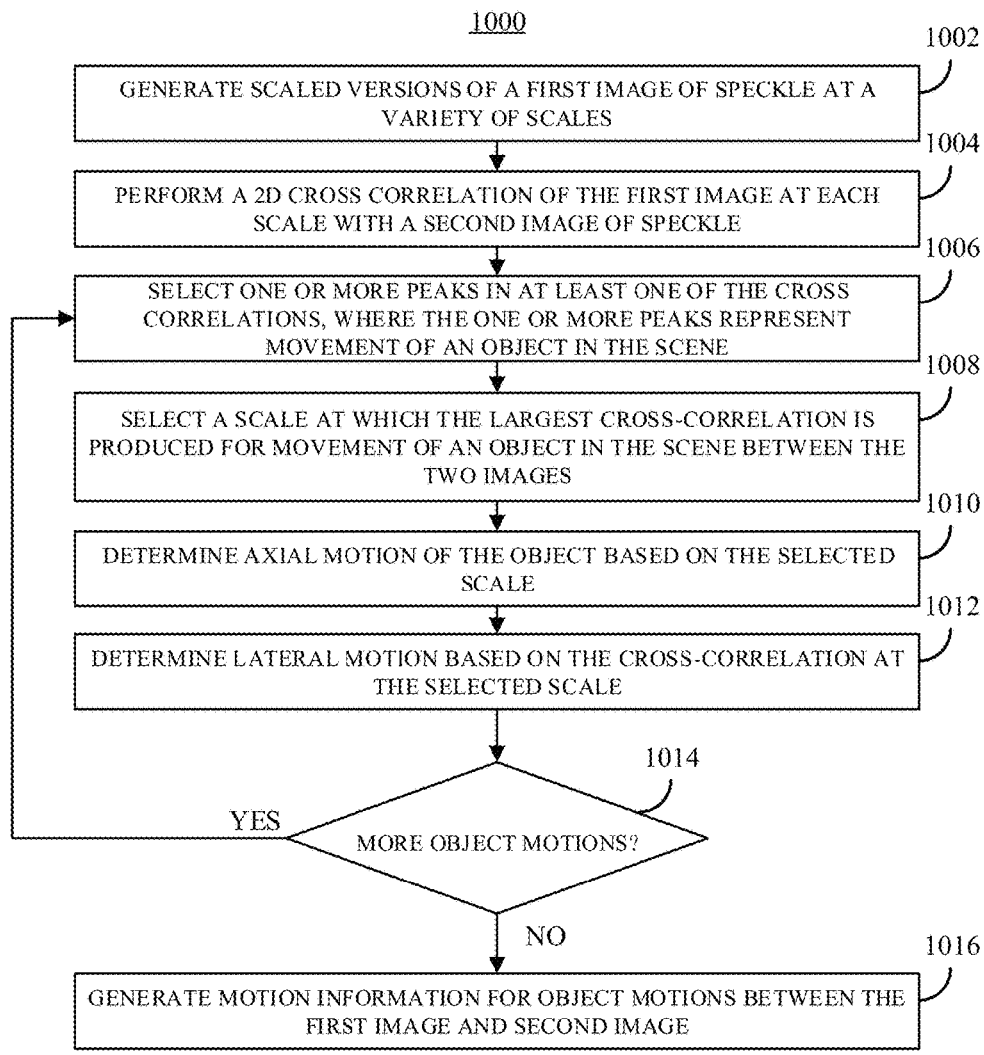
FIG. 10 shows an example of a process for determining motion of multiple objects between two speckle images in accordance with some embodiments of the disclosed subject matter.

FIG. 10 shows an example 1000 of a process for determining motion of multiple objects between two speckle images in accordance with some embodiments of the disclosed subject matter. As shown in FIG. 10, process 1000 can start at 1002 by generating scaled versions of a first image of speckle at a variety of scales. In some embodiments, process 1000 can use any suitable technique or combination of techniques to generate scaled images. For example, the first image can be expanded and contracted by varying amounts (e.g., as described above in connection with FIG. 5A). In some embodiments, any suitable number of scaled images can be generated in any suitable increment or increments. For example, the first image can be scaled over a range from −20% to +20% in increments of 1%. As another example, the image can be scaled at smaller increments near the scale of the original version of the image, and larger increments farther from the scale of the original version of the image.

At 1004, process 1000 can perform a two-dimensional cross-correlation between the first image at each scale and a second speckle image of the scene captured at another time. Process 1000 can use any suitable technique or combination of techniques to perform the cross-correlation, such as techniques described above in connection with FIGS. 4A to 7. Note that, although the first image is generally described herein as being captured before the second image, the first image can be an image captured after the second image. Additionally, in some embodiments, process 1000 can select the first image and second image from a series of speckle images captured using an image sensor (e.g., image sensor 804), such as the series of images captured as described above in connection with process 900 of FIG. 9. In some embodiments, the first image and second image can be images that were consecutively captured. Alternatively, the first image and second image can be images that were captured non-consecutively.

At 1006, process 1000 can select a peak from one of the cross-correlations that represents movement of an object in the scene. In some embodiments, process 1000 can use any suitable technique or combination of technique to select a peak. For example, process 1000 can select a peak from among all peaks in all of the cross-correlations that has a largest value. As another example, process 1000 can select a subset of peaks with a value that meets and/or exceeds a threshold value, which can be a predetermined threshold or a threshold based on the peak values present in the cross-correlation.

At 1008, process 1000 can select a scale at which the largest cross-correlation is produced for movement of an object in the scene between the two scenes. For example, process 1000 can select the scale as described above in connection with Equation 17. In some embodiments, as described above in connection with FIG. 5C, process 1000 can select a scale by fitting the values of the peaks to a Gaussian model, and selecting a peak based on the Gaussian model if the largest peak from the cross-correlations does not coincide with the peak in the fitted Gaussian model. In some embodiments, if the scale is selected using the fitted Gaussian model, the first image can be scaled to a value based on the selected scale and cross-correlated with the second image to produce another cross-correlation from which the lateral motion of the object can be determined.

At 1010, process 1000 can determine axial motion of the object based on the scale selected at 1008. For example, as described above in connection with Equation 18, process 1000 can generate the axial portion of an object translation vector based on the selected scale $\hat{\chi}$.

At 1012, process 1000 can determine the lateral motion of the object based on the location of the peak in the cross-correlation between the first image scaled at scale selected at 1008 and the second image. For example, the peak can indicate a horizontal shift $\Delta u$ and a vertical shift $\Delta v$ that process 1000 can use to determine the horizontal and vertical motion, respectively (e.g., as described above in connection with Equation 18).

At 1014, process 1000 can determine whether there are additional object motions represented in the cross-correlations between the two speckle images. In some embodiments, process 1000 can use any suitable technique or combination of techniques to determine whether there are additional object motions represented in the cross-correlations between the two speckle images. For example, process

1000 can determine whether there are additional peaks in the various cross-correlations that likely do not correspond to the object for which motion was determined at 1010 and 1012. As another example, process 1000 can search for any peaks that are greater than a threshold value in the cross-correlations, and can identify the peaks that meet the threshold (e.g., are greater than, greater than or equal to, etc.) as potentially corresponding to object motion. In some embodiments, the threshold can be dynamically determined based on the values in the cross-correlation. For example, the threshold can be determined based on the highest value peak or peaks present in the results of the cross-correlations. In some embodiments, as the number of moving objects in the scene increases the correlation peak intensities may decrease. The maximum number of moving objects that can be detected can be dependent on scene, illumination, and sensor characteristics.

If there are additional object motions ("YES" at 1014), process 1000 can return to 1006 to select one or more peaks corresponding to object motion of other objects. Otherwise, if there are no more object motions ("NO" at 1014), process 1000 can generate motion information for object motions between the first image and the second image based on the determined axial motion and lateral motion for each object evaluated by process 1000. In some embodiments, the motion information can represented as a series of motion vectors, a matrix representing motion vectors for each object motion, etc. In some embodiments, the motion information can be associated with the first image and the second image to indicate that the motion information represents motion between the two images. In some embodiments, process 1000 can execute 1006-1012 for multiple peaks substantially simultaneously (i.e., in parallel).

In some embodiments, process 1000 can generate motion information for various different pairs of images to represent motion of objects in the scene over time. Such information can be used to, for example, create a 3D motion histogram representing motion in the scene over a particular period of time, as described above in connection with FIG. 7 (and as described below in connection with FIG. 13).

Figure 11:
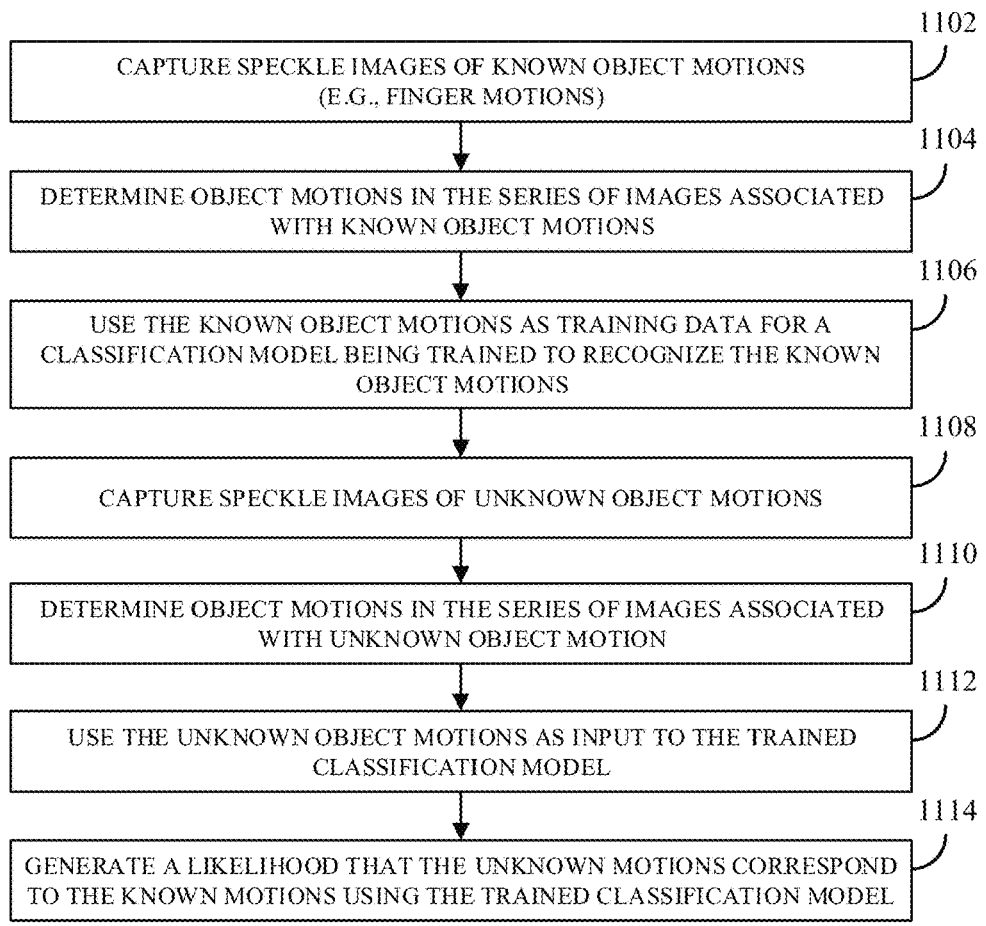
FIG. 11 shows an example of a process for using motion information generated from a series of images of a scene to recognize motion in the scene in accordance with some embodiments of the disclosed subject matter.

FIG. 11 shows an example 1100 of a process for using motion information generated from a series of images of a scene to recognize motion in the scene in accordance with some embodiments of the disclosed subject matter. At 1102, process 1100 can cause an image sensor (e.g., image sensor 802) to capture a series of speckle images of scenes including known motions. For example, process 1100 can capture images of hand motions performed by human subjects that have been instructed to perform a certain hand gesture. For example, these hand gestures can include the hand gestures described below in connection with FIG. 12. In some embodiments, process 1100 can capture images of one or more of the gestures being performed any suitable number of times. In a particular example, five subjects can be instructed to perform each of the gestures described below in connection with FIG. 12 five times each. In the example, the subjects can be shown an example of each gesture, and be instructed to place their hand approximately 0.5 meter from the image sensor to perform the gestures. The gestures can be recorded at any suitable frame rate (e.g., 660 frames-per second) using an image sensor (e.g., image sensor 804) at a 256×256-pixel resolution. Additionally or alternatively, the speckle images can be captured by another device and transmitted to a device executing process 1100, which can receive the images at 1102.

At 1104, process 1100 can determine object motions in the series of images that are associated with the known object motions. For example, object motion information can be determined using process 900 and/or process 1000 described above in connection with FIGS. 9 and 10. Additionally or alternatively, process 1100 can receive motion information calculated by another device that is associated with a known motion (e.g., a known gesture). In some embodiments, process 1100 can use the motion information for each series of images corresponding to a known gesture to compute a 3D motion histogram representing motion between pairs of consecutive frames. In some embodiments, process 1100 can represent the motion in the motion histograms using feature vectors that include the top M motion modes (e.g., M strongest cross-correlation peaks) from each motion histogram within histograms representing an N-frame window. In some such embodiments, each motion mode can be represented as a 4-vector (x, y, z, intensity), consisting of the location and the intensity of the corresponding correlation peak (e.g., as described above in connection with FIGS. 5A-5C, 6, 7 and 9. In some embodiments, the motion modes from a histogram can be ordered by peak intensity and concatenated to form a vector of length 4M, where each 4M-length vector can then be concatenated within the temporal window to form a final 4MN-length feature vector, which can be used as the input to a gesture classification model. In a particular example, feature vectors can be generated for hand gesture recognition with M=10 modes and a temporal window size of N=200 frames, which can corresponds to M=10 dominant independently moving objects, and a temporal duration of N/660≈0.3 seconds.

At 1106, process 1100 can use the motion information determined at 1104 as training data to train a classification model to recognize one or more of the known object motions. Any suitable machine learning technique or combination of techniques can be used to train a classification model to recognize the gestures represented in the motion information derived from the speckle images captured at 1102. For example, support vector machines, hidden Markov models based on temporal time-series analysis, and/or convolutional neural networks can be trained to recognize unknown examples of the known object motions based on the motion information in the images captured at 1102. As another example, a random forest classifier (e.g., as described by the scikit-learn library at scikit-learn (dot) org), which generally exhibits a high degree of computational efficiency, and low memory usage, which can be appropriate for use in relatively low power devices, such as smartphones, tablet computers, wearable computers, etc. In a more particular example, using a 32-core processor with a base frequency of 2.60 GHz, training took ≈40 seconds for ≈40,000 samples (with one sample corresponding to a single feature vector as described above) and test-time classification took ≈0.27 seconds for ≈9000 test samples. In such an example, a gesture instance can be a set of samples (e.g., frames) spanning a time duration of approximately 0.7 seconds. In such an example, the amount of training (and testing) information can be increased by extracting multiple feature vectors from within each gesture instance by shifting the window of N frames (from which a single sample can be extracted) one frame at a time. This can result in ≈280 feature vectors (samples) per gesture instance. In some embodiments, process 1100 can test the classification model trained at 1106 using motion information corresponding to known object motions that may not have been used during the training of the classification model.

At 1108, process 1100 can cause an image sensor (e.g., image sensor 802) to capture a series of speckle images of a scene including unknown object motions. For example, process 1100 can cause the image sensor to capture speckle images of a scene that may include a hand of a subject performing an unknown hand gesture.

At 1110, process 1100 can determine motion information for objects in the scene that includes the unknown object motions from the series of images captured at 1108. In some embodiments, process 1100 can capture images and determine motion information from a window of the most recent N frames (e.g., as described above in connection with 1104). In some embodiments, a secondary device (e.g., a motion sensor, a camera, etc.) can be used to determine whether the unknown motion in the scene likely represents an example of a known object motion. For example, the secondary device can be used to determine if there is a hand (or other object) in the field of view of the image sensor used to capture the speckle images. Process 1100 can use any suitable technique or combination of techniques to determine the motion information from the images captured at 1108.

At 1112, process 1100 can use the motion information corresponding to the unknown object motions as input to the trained classification model or models. For example, a feature vector as described above in connection with 1104 can be provided to the trained classification model(s) as input to be classified.

At 1114, process 1100 can use the output from the trained classification model to generate one or more likelihoods that the unknown motion in the scene corresponds to a particular known motion. For example, the classification model or models can output a likelihood(s) that the motion represented by the feature vector provided at 1112 corresponds to a particular known motion.

In some embodiments, the portion of process 1100 for training the classification model can be executed by a first device (e.g., a server) and the trained classification model can be provided to another device (e.g., a smartphone, a tablet computer, a wearable computer, a laptop computer, etc.) for recognizing unknown gestures or other motions. Additionally or alternatively, process 1100 can be executed by a single device, which can, for example, train the classification model to recognize gestures performed by a particular subject or subjects.

Figure 12:
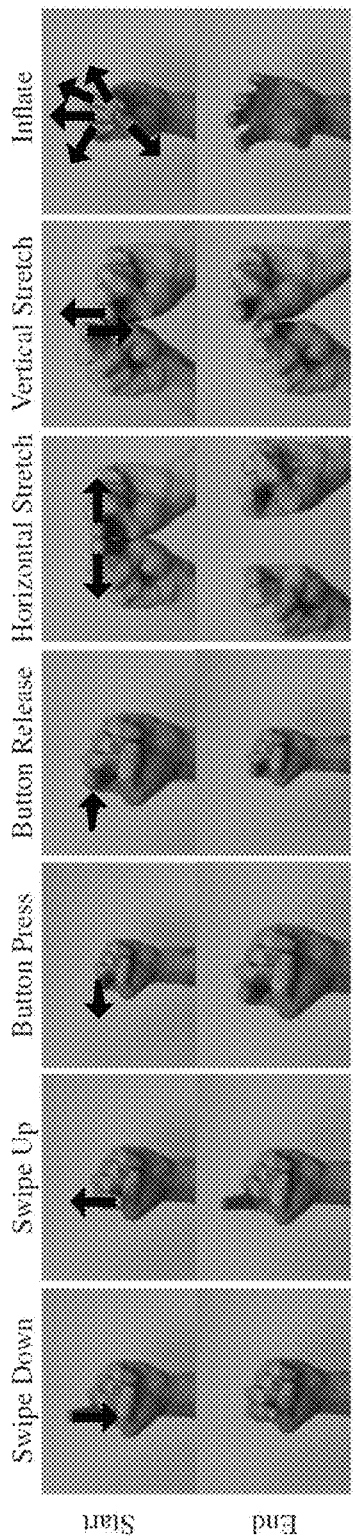
FIG. 12 shows examples of gestures that the classification model described above in connection with FIG. 11 can be trained to recognize in accordance with some embodiments of the disclosed subject matter.

FIG. 12 shows examples of gestures that the classification model described above in connection with FIG. 11 can be trained to recognize in accordance with some embodiments of the disclosed subject matter. As shown in FIG. 12, the gestures can include a swipe down and a swipe up involving small single-finger lateral motions, a button press and a button release involving small axial motions, a horizontal stretch and a vertical stretch involving simultaneous motion by two fingers in opposite directions, and an inflate gesture involving simultaneous motion by multiple fingers with significant axial and lateral components.

Figure 13:
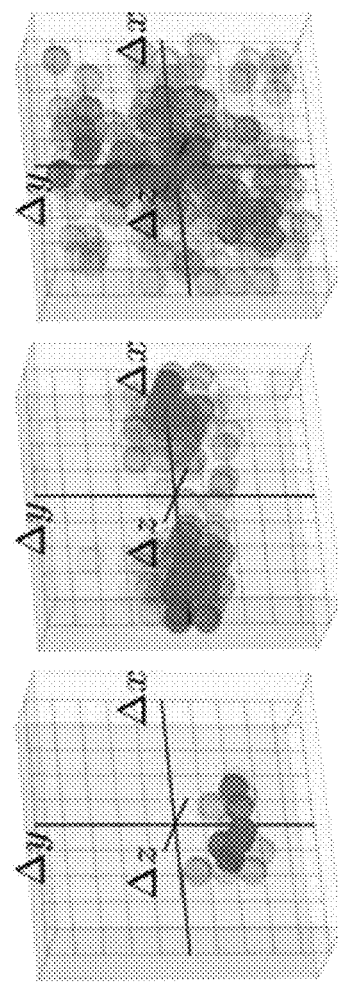
FIG. 13 shows examples of 3D motion histograms representing various gestures in accordance with some embodiments of the disclosed subject matter.

FIG. 13 shows examples of 3D motion histograms representing various gestures in accordance with some embodiments of the disclosed subject matter. As shown in FIG. 13, a histogram representing a swipe down, a horizontal stretch, and an inflate gesture can include distinctive features clustered based on the gesture being performed. The gestures described in connection with FIGS. 12 and 13 can be characterized as gestures involving relatively subtle motion, as opposed to pose gestures which can involve recognizing the spatial configuration of the hand and can more easily be distinguished by a camera. Note that, in the motion histograms shown in FIG. 13, the bins each represent a 20 micron motion.

As shown below in Table 1, an example of results generated by a classification model trained using the mechanisms described herein to recognize unknown inputs from a non-specific user.

TABLE 1

|    | SD   | SU   | BP   | BR   | HS   | VS   | IF   |
|----|------|------|------|------|------|------|------|
| SD | 84%  | 2%   | 1%   | 0%   | 5%   | 4%   | 3%   |
| SU | 9%   | 82%  | 0%   | 1%   | 2%   | 4%   | 1%   |
| BP | 4%   | 1%   | 61%  | 10%  | 3%   | 7%   | 14%  |
| BR | 2%   | 5%   | 8%   | 52%  | 7%   | 11%  | 15%  |
| HS | 0%   | 0%   | 1%   | 5%   | 83%  | 4%   | 7%   |
| VS | 1%   | 1%   | 1%   | 2%   | 4%   | 89%  | 1%   |
| IF | 0%   | 0%   | 0%   | 0%   | 4%   | 7%   | 89%  |

SD = Swipe Down,
SU = Swipe Up,
BP = Button Press,
BR = Button Release,
HS = Horizontal Stretch
VS = Vertical Stretch,
IF = Inflate In the results illustrated by Table 1, the overall multi-class sample-level classification accuracy was 78%. The overall gesture-level classification accuracy, computed by taking the modal class label for each gesture trial, was 83%. The trained classification model was able to recognize most gestures with relatively high (>80%) accuracy. Whereas gestures involving axial motion (e.g., Button Press and Button Release) were more difficult to accurately recognize (e.g., due to the lower sensitivity when recognizing axial motion). As shown below in Table 2, an example of results generated by a classification model trained using the mechanisms described herein to recognize unknown inputs from a user that provided the training samples.

TABLE 2

|    | SD   | SU   | BP   | BR   | HS   | VS   | IF   |
|----|------|------|------|------|------|------|------|
| S1 | 100% | 100% | 100% | 100% | 90%  | 86%  | 99%  |
| S2 | 94%  | 69%  | 53%  | 39%  | 69%  | 87%  | 100% |
| S3 | 91%  | 62%  | 40%  | 26%  | 79%  | 99%  | 69%  |
| S4 | 39%  | 75%  | 3%   | 0%   | 86%  | 85%  | 100% |
| S5 | 90%  | 100% | 92%  | 67%  | 86%  | 91%  | 88%  |

Figure 14:
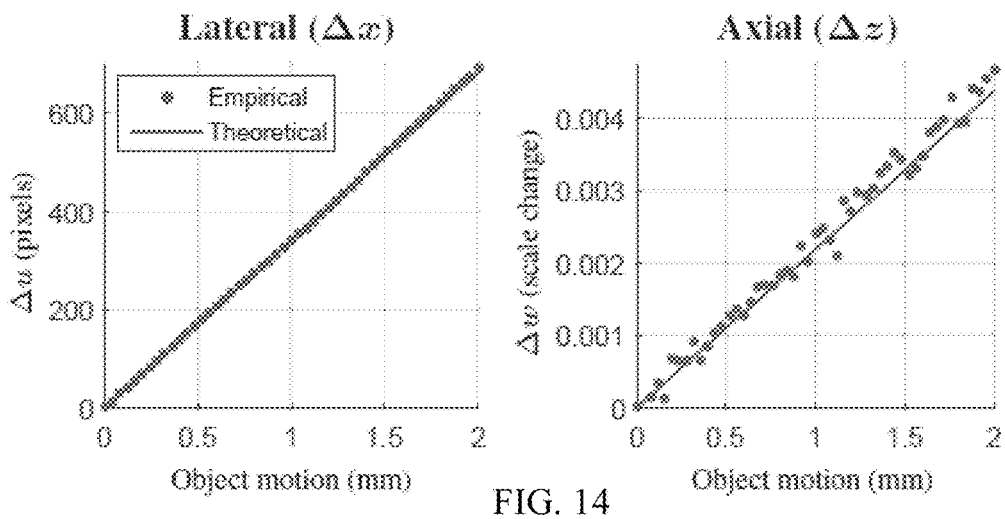
FIG. 14 shows an example comparing theoretical accuracy in recognizing object motions and observed accuracy in an example system.

FIG. 14 shows an example comparing theoretical accuracy in recognizing object motions and observed accuracy in an example system. The example system can be an imaging system that includes the Grasshopper 3 sensor described above in connection with FIG. 8, and a 532 nm laser offset from the sensor by about 4.5 cm. The results were generated based on images captured of a 5 mm-diameter piece of white chalk as a target object. The surface of chalk is microscopically rough, and has negligible sub-surface scattering. The target was mounted on a linear stage using a thin matte black rod, and the whole assembly was mounted on an optical table supported by air cushions to minimize vibrations. Matte black velvet cloth was used as background so that most of the received light came from the target object.

To measure lateral accuracy of the test system, the target object was moved from left to right along the x-axis (however, the y-axis can be considered in a similar manner) in increments of 40 µm, and a speckle image was recorded after each increment. The amount of speckle shift was measured between pairs of frames using the techniques described herein (e.g., as described above in connection with Equation 13). Over a 2-mm motion sequence, the mean shift was measured to be 13.98 pixels per 40 µm of lateral motion, or a slope of 0.348 pixels/μm. This agrees with the theoretical prediction produced from Equation 8 of a slope of 0.341 pixels/μm. The speckle motion model for lateral motion is quasi-invariant to scene geometry (e.g., depth, lateral offset) and object properties (e.g., size, shape, wide range of materials).

To measure the axial accuracy of the test system, the target object was moved from a distance of 50 cm toward the sensor along the z-axis in increments of 40 μm. The image scale factor $\chi$ between pairs of frames was calculated using the techniques described herein in connection with FIGS. 5A-5C. For a 2-mm motion (e.g., Frame 1 vs. Frame 2), the system measured the scale to be $4.66\times10^{-3}$, which substantially agrees with the theoretical prediction from Equation 8 of $4.38\times10^{-3}$ for the same axial motion. Note that the theoretical prediction was calculated with a correction for the offset between the sensor and the light source. In general, axial motion measurements are dependent on scene depth, however, if the axial motion is significantly smaller than the distance from the sensor to the object, the depth can be considered approximately constant, making the axial motion estimates quasi-invariant to scene depths.

Figure 15:
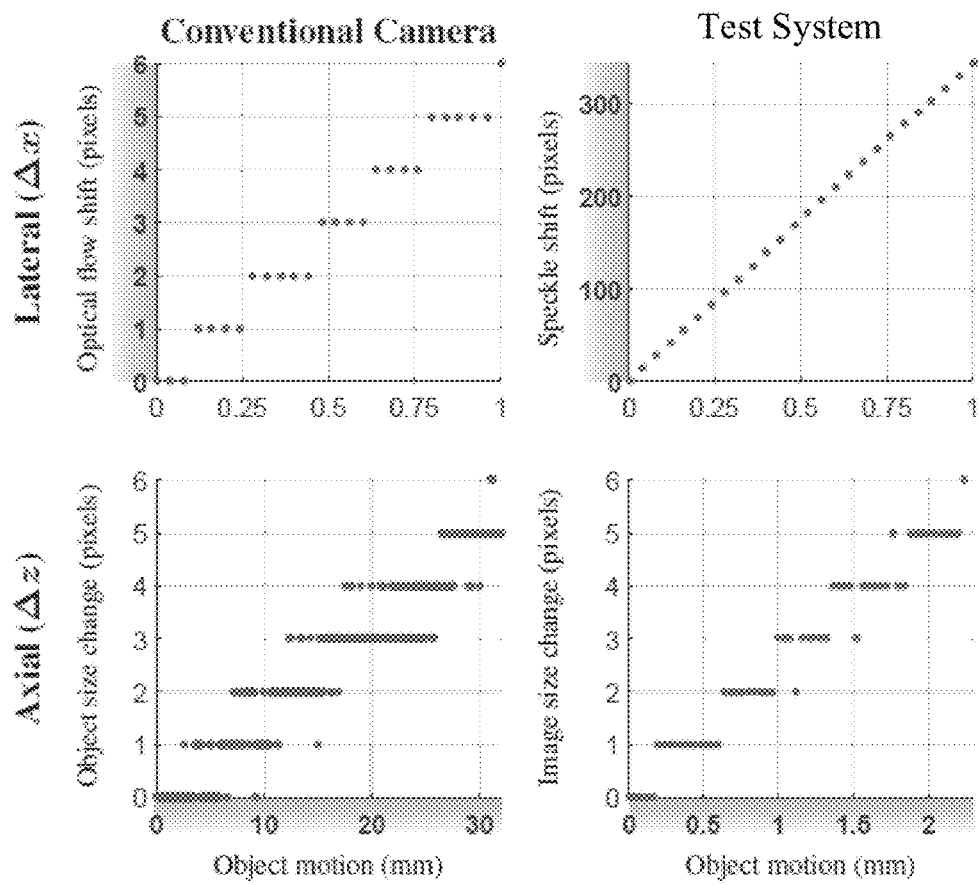
FIG. 15 shows examples comparing motion measurements made using a conventional camera and motion measurements made using the test system.

FIG. 15 shows examples comparing motion measurements made using a conventional camera and motion measurements made using the test system. To measure the lateral motion magnification ratio (i.e., $R_X^{motionMag}$) between a conventional camera and the test system, the first frame in the sequence and each subsequent frame can be compared to determine the amount of lateral motion (e.g., Frame 1 vs. Frame 2, Frame 1 vs. Frame 3, etc.) A correlation-based optical flow algorithm was used with the output of the conventional camera to compute image motion. The top row of FIG. 15 compares the object motion calculated from images captured by the conventional camera (in the left column), and object motion from speckle images captured by the test system (in the right column), for the same object x-translation. The measured lateral motion magnification ratio is approximately 60:1 (i.e., the test system was approximately 60 times more sensitive to lateral motion than the conventional camera), which is consistent with the theoretical prediction from Equation 10:

$$R_X^{motionMag} = \frac{2d}{f} = 2\times\frac{500}{16} \approx 62,$$

for d=50 cm, and focal length f=16 mm.

To measure the axial motion magnification ratio (i.e., $R_Z^{motionMag}$), we the first frame in the sequence and each subsequent frame can be compared to determine the amount of axial motion (e.g., Frame 1 vs. Frame 2, Frame 1 vs. Frame 3, etc.) A simple scale space algorithm was used with the output of the conventional camera to compute the change in object size due to object motion. The bottom row of FIG. 15 compares the object motion required to create the same image scale change for the conventional camera (in the left column), and the test system (in the right column). The units of image scale change are given in image size increments. While the theoretically predicted value for the axial motion magnification ratio is 1, using the techniques described above in connection with FIGS. 5A-5C, a significantly higher measured magnification ratio of approximately 15:1 was observed because the test system used a bare sensor, and thus, can measure speckle scale change over the entire image, including the periphery (where the speckle motion is larger), and not just a small patch centered on the object (where the image motion is smaller). In general, the amount of axial motion magnification depends on a variety of scene characteristics, including scene geometry and reflectance properties.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 9-11 can be executed or performed in any order or sequence not limited to the order and sequence shown and described in the figures. Also, some of the above steps of the processes of FIGS. 9-11 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for three dimensional motion estimation, the system comprising:
  a light source configured to emit light toward a scene, wherein the light is substantially temporally coherent around a center frequency λ;
  an image sensor; and
  a hardware processor that is programmed to:
    cause the light source to emit light toward the scene;
    cause the image sensor to capture a first defocused image of the scene at a first time, wherein the first defocused image includes a first speckle pattern generated by an object in the scene reflecting the light emitted by the light source;
    cause the image sensor to capture a second defocused image of the scene at a second time, wherein the second defocused image includes a second speckle pattern generated by the object in the scene reflecting the light emitted by the light source;
    generate a first scaled version of the first defocused image by expanding the first defocused image by a predetermined amount;
    generate a second scaled version of the first defocused image by contracting the first defocused image by the predetermined amount;

compare the first defocused image to the second defocused image;
compare the first scaled version of the first defocused image to the second defocused image;
compare the second scaled version of the first defocused image to the second defocused image;
determine axial motion of the object between the first time and the second time based on the comparisons; and
determine lateral motion of the object between the first time and second time based on the comparisons.

2. The system of claim 1, wherein the hardware processor is further programmed to:
calculate, for the first defocused image, a first two-dimensional cross-correlation with the second defocused image, wherein the first two-dimensional cross-correlation includes a peak with a first intensity at a first location, the first intensity indicative of how closely the first speckle pattern in the first defocused image matches the second speckle pattern in the second defocused image and the first location indicative of lateral motion of the object between the first time and the second time;
calculate, for the first scaled version of the first defocused image, a second two-dimensional cross-correlation with the second defocused image, wherein the second two-dimensional cross-correlation includes a peak with a second intensity at a second location, the second intensity indicative of how closely the first speckle pattern in the first scaled version of the first defocused image matches the second speckle pattern in the second defocused image and the second location indicative of lateral motion of the object between the first time and the second time; and
calculate, for the second scaled version of the first defocused image, a third two-dimensional cross-correlation with the second defocused image; wherein the third two-dimensional cross-correlation includes a peak with a third intensity at a third location, the third intensity indicative of how closely the first speckle pattern in the second scaled version of the first defocused image matches the second speckle pattern in the second defocused image and the third location indicative of lateral motion of the object between the first time and the second time.

3. The system of claim 2, wherein the hardware processor is further programmed to:
compare at least the intensity of the first peak, the second peak, and the third peak; and
select a version of the first defocused image that includes the largest intensity peak; and
determine the axial motion of the object based on the scale of the selected version of the first defocused image.

4. The system of claim 1, wherein the hardware processor is further programmed to:
receive information indicating that the motion of the object between the first time and the second corresponds to a first hand gesture;
generate motion information indicative of motion of the object between the first time and the second time based on the axial motion and the lateral motion;
provide the motion information as input to a classification model as training data for training the classification model to recognize the first hand gesture input;
generate a trained classification model using the input, wherein the trained classification model is configured to receive motion information of a scene as input and output a likelihood that the received motion information corresponds to the first hand gesture.

5. The system of claim 4, wherein the hardware processor is further programmed to:
cause the light source to emit light toward a second scene that is different than the scene subsequent to generating the trained classification model;
cause the image sensor to capture a third defocused image of the second scene at a third time, wherein the third defocused image includes a third speckle pattern generated by an object in the second scene reflecting the light emitted by the light source;
cause the image sensor to capture a fourth defocused image of the second scene at a fourth time, wherein the fourth defocused image includes a fourth speckle pattern generated by the object in the second scene reflecting the light emitted by the light source;
generate a first scaled version of the third defocused image by expanding the first defocused image by a predetermined amount;
generate a second scaled version of the third defocused image by contracting the first defocused image by the predetermined amount;
compare the third defocused image to the fourth defocused image;
compare the first scaled version of the third defocused image to the fourth defocused image;
compare the second scaled version of the third defocused image to the fourth defocused image;
determine second axial motion of the object in the second scene between the third time and the fourth time based on the comparisons;
determine second lateral motion of the object in the second scene between the third time and fourth time based on the comparisons;
generate second motion information indicative of motion of the object in the second scene between the third time and the fourth time based on the second axial motion and the second lateral motion;
provide the second motion information as input to the trained classification model; and
receive output from the trained classification model indicating a likelihood that the motion in the second scene corresponds to the first hand gesture.

6. The system of claim 1, wherein the light source comprises a laser diode.

7. The system of claim 1, wherein the coherence area of the temporally coherent light at the object is less than 1 mm.

8. The system of claim 1, wherein the first defocused image includes a first total speckle pattern with contributions from the first speckle pattern and a third speckle pattern generated by a second object in the scene, and
the second defocused image includes a second total speckle pattern with contributions from the second speckle pattern and a fourth speckle pattern generated by the second object in the scene,
wherein the hardware processor is further programmed to:
generate a third scaled version of the first defocused image by expanding the first defocused image by a second predetermined amount;
compare the third scaled version of the first defocused image to the second defocused image;
determine axial motion of the second object between the first time and the second time based on the comparisons; and determine lateral motion of the second object between the first time and second time based on the comparisons.

9. A method for three dimensional motion estimation, the method comprising:
   causing a light source to emit light toward a scene, wherein the light is substantially temporally coherent around a center frequency λ;
   causing an image sensor to capture a first defocused image of the scene at a first time, wherein the first defocused image includes a first speckle pattern generated by an object in the scene reflecting the light emitted by the light source;
   causing the image sensor to capture a second defocused image of the scene at a second time, wherein the second defocused image includes a second speckle pattern generated by the object in the scene reflecting the light emitted by the light source;
   generating a first scaled version of the first defocused image by expanding the first defocused image by a predetermined amount;
   generating a second scaled version of the first defocused image by contracting the first defocused image by the predetermined amount;
   comparing the first defocused image to the second defocused image;
   comparing the first scaled version of the first defocused image to the second defocused image;
   comparing the second scaled version of the first defocused image to the second defocused image;
   determining axial motion of the object between the first time and the second time based on the comparisons; and
   determining lateral motion of the object between the first time and second time based on the comparisons.

10. The method of claim 9, wherein comparing the first defocused image to the second defocused image comprises calculating, for the first defocused image, a first two-dimensional cross-correlation with the second defocused image, wherein the first two-dimensional cross-correlation includes a peak with a first intensity at a first location, the first intensity indicative of how closely the first speckle pattern in the first defocused image matches the second speckle pattern in the second defocused image and the first location indicative of lateral motion of the object between the first time and the second time,
   comparing the first scaled version of the first defocused image to the second defocused image comprises calculating, for the first scaled version of the first defocused image, a second two-dimensional cross-correlation with the second defocused image, wherein the second two-dimensional cross-correlation includes a peak with a second intensity at a second location, the second intensity indicative of how closely the first speckle pattern in the first scaled version of the first defocused image matches the second speckle pattern in the second defocused image and the second location indicative of lateral motion of the object between the first time and the second time; and
   comparing the second scaled version of the first defocused image to the second defocused image comprises calculating, for the second scaled version of the first defocused image, a third two-dimensional cross-correlation with the second defocused image; wherein the third two-dimensional cross-correlation includes a peak with a third intensity at a third location, the third intensity indicative of how closely the first speckle pattern in the second scaled version of the first defocused image matches the second speckle pattern in the second defocused image and the third location indicative of lateral motion of the object between the first time and the second time.

11. The method of claim 10, the method further comprising:
   comparing the intensity of at least the first peak, the second peak, and the third peak; and
   selecting a version of the first defocused image that includes the largest intensity peak; and
   determining the axial motion of the object based on the scale of the selected version of the first defocused image.

12. The method of claim 9, the method further comprising:
   receiving information indicating that the motion of the object between the first time and the second corresponds to a first hand gesture;
   generating motion information indicative of motion of the object between the first time and the second time based on the axial motion and the lateral motion;
   providing the motion information as input to a classification model as training data for training the classification model to recognize the first hand gesture input;
   generating a trained classification model using the input, wherein the trained classification model is configured to receive motion information of a scene as input and output a likelihood that the received motion information corresponds to the first hand gesture.

13. The method of claim 12, the method further comprising:
   causing the light source to emit light toward a second scene that is different than the scene subsequent to generating the trained classification model;
   causing the image sensor to capture a third defocused image of the second scene at a third time, wherein the third defocused image includes a third speckle pattern generated by an object in the second scene reflecting the light emitted by the light source;
   causing the image sensor to capture a fourth defocused image of the second scene at a fourth time, wherein the fourth defocused image includes a fourth speckle pattern generated by the object in the second scene reflecting the light emitted by the light source;
   generating a first scaled version of the third defocused image by expanding the first defocused image by a predetermined amount;
   generating a second scaled version of the third defocused image by contracting the first defocused image by the predetermined amount;
   comparing the third defocused image to the fourth defocused image;
   comparing the first scaled version of the third defocused image to the fourth defocused image;
   comparing the second scaled version of the third defocused image to the fourth defocused image;
   determining second axial motion of the object in the second scene between the third time and the fourth time based on the comparisons;
   determining second lateral motion of the object in the second scene between the third time and fourth time based on the comparisons;
   generating second motion information indicative of motion of the object in the second scene between the third time and the fourth time based on the second axial motion and the second lateral motion;

providing the second motion information as input to the trained classification model; and receiving output from the trained classification model indicating a likelihood that the motion of the second object corresponds to the first hand gesture.

14. The method of claim 9, wherein the light source comprises a laser diode.

15. The method of claim 9, wherein the coherence area of the temporally coherent light at the object is less than 1 mm.

16. The method of claim 9, wherein the first defocused image includes a first total speckle pattern with contributions from the first speckle pattern and a third speckle pattern generated by a second object in the scene, and the second defocused image includes a second total speckle pattern with contributions from the second speckle pattern and a fourth speckle pattern generated by the second object in the scene, the method further comprising:

generating a third scaled version of the first defocused image by expanding the first defocused image by a second predetermined amount;

comparing the third scaled version of the first defocused image to the second defocused image;

determining axial motion of the second object between the first time and the second time based on the comparisons; and determining lateral motion of the second object between the first time and second time based on the comparisons.

17. A non-transitory computer readable medium containing computer executable instructions that, when executed by a processor, cause the processor to perform a method for three dimensional motion estimation, the method comprising:

causing a light source to emit temporally coherent light toward a scene;

causing an image sensor to capture a first defocused image of the scene at a first time, wherein the first defocused image includes a first speckle pattern generated by an object in the scene reflecting the light emitted by the light source;

causing the image sensor to capture a second defocused image of the scene at a second time, wherein the second defocused image includes a second speckle pattern generated by the object in the scene reflecting the light emitted by the light source;

generating a first scaled version of the first defocused image by expanding the first defocused image by a predetermined amount;

generating a second scaled version of the first defocused image by contracting the first defocused image by the predetermined amount;

comparing the first defocused image to the second defocused image;

comparing the first scaled version of the first defocused image to the second defocused image;

comparing the second scaled version of the first defocused image to the second defocused image;

determining axial motion of the object between the first time and the second time based on the comparisons; and determining lateral motion of the object between the first time and second time based on the comparisons.

18. The non-transitory computer-readable medium of claim 17, wherein comparing the first defocused image to the second defocused image comprises calculating, for the first defocused image, a first two-dimensional cross-correlation with the second defocused image, wherein the first two-dimensional cross-correlation includes a peak with a first intensity at a first location, the first intensity indicative of how closely the first speckle pattern in the first defocused image matches the second speckle pattern in the second defocused image and the first location indicative of lateral motion of the object between the first time and the second time, comparing the first scaled version of the first defocused image to the second defocused image comprises calculating, for the first scaled version of the first defocused image, a second two-dimensional cross-correlation with the second defocused image, wherein the second two-dimensional cross-correlation includes a peak with a second intensity at a second location, the second intensity indicative of how closely the first speckle pattern in the first scaled version of the first defocused image matches the second speckle pattern in the second defocused image and the second location indicative of lateral motion of the object between the first time and the second time; and comparing the second scaled version of the first defocused image to the second defocused image comprises calculating, for the second scaled version of the first defocused image, a third two-dimensional cross-correlation with the second defocused image; wherein the third two-dimensional cross-correlation includes a peak with a third intensity at a third location, the third intensity indicative of how closely the first speckle pattern in the second scaled version of the first defocused image matches the second speckle pattern in the second defocused image and the third location indicative of lateral motion of the object between the first time and the second time.

19. The non-transitory computer-readable medium of claim 18, wherein the method further comprises:

comparing the intensity of at least the first peak, the second peak, and the third peak; and selecting a version of the first defocused image that includes the largest intensity peak; and determining the axial motion of the object based on the scale of the selected version of the first defocused image.

20. The non-transitory computer-readable medium of claim 17, wherein the method further comprises:

receiving information indicating that the motion of the object between the first time and the second corresponds to a first hand gesture;

generating motion information indicative of motion of the object between the first time and the second time based on the axial motion and the lateral motion;

providing the motion information as input to a classification model as training data for training the classification model to recognize the first hand gesture input;

generating a trained classification model using the input, wherein the trained classification model is configured to receive motion information of a scene as input and output a likelihood that the received motion information corresponds to the first hand gesture.

21. The non-transitory computer-readable medium of claim 20, wherein the method further comprises:

causing the light source to emit light toward a second scene that is different than the scene subsequent to generating the trained classification model;

causing the image sensor to capture a third defocused image of the second scene at a third time, wherein the third defocused image includes a third speckle pattern generated by an object in the second scene reflecting the light emitted by the light source;

causing the image sensor to capture a fourth defocused image of the second scene at a fourth time, wherein the fourth defocused image includes a fourth speckle pattern generated by the object in the second scene reflecting the light emitted by the light source;

generating a first scaled version of the third defocused image by expanding the first defocused image by a predetermined amount;

generating a second scaled version of the third defocused image by contracting the first defocused image by the predetermined amount;

comparing the third defocused image to the fourth defocused image;

comparing the first scaled version of the third defocused image to the fourth defocused image;

comparing the second scaled version of the third defocused image to the fourth defocused image;

determining second axial motion of the object in the second scene between the third time and the fourth time based on the comparisons;

determining second lateral motion of the object in the second scene between the third time and fourth time based on the comparisons;

generating second motion information indicative of motion of the object in the second scene between the third time and the fourth time based on the second axial motion and the second lateral motion;

providing the second motion information as input to the trained classification model; and receiving output from the trained classification model indicating a likelihood that the motion of the second object corresponds to the first hand gesture.

22. The non-transitory computer-readable medium of claim 17, wherein the light source comprises a laser diode.

23. The non-transitory computer-readable medium of claim 17, wherein the coherence area of the temporally coherent light at the object is less than 1 mm.

24. The non-transitory computer-readable medium of claim 17, wherein the first defocused image includes a first total speckle pattern with contributions from the first speckle pattern and a third speckle pattern generated by a second object in the scene, and the second defocused image includes a second total speckle pattern with contributions from the second speckle pattern and a fourth speckle pattern generated by the second object in the scene, wherein the method further comprises:

generating a third scaled version of the first defocused image by expanding the first defocused image by a second predetermined amount;

comparing the third scaled version of the first defocused image to the second defocused image;

determining axial motion of the second object between the first time and the second time based on the comparisons; and determining lateral motion of the second object between the first time and second time based on the comparisons.

* * * * *

UNITED STATES PATENT AND TRADEMARK OFFICE
CERTIFICATE OF CORRECTION

PATENT NO. : 10,152,798 B2
APPLICATION NO. : 15/483007
DATED : December 11, 2018
INVENTOR(S) : Mohit Gupta et al.

Page 1 of 1

It is certified that error appears in the above-identified patent and that said Letters Patent is hereby corrected as shown below:

In the Specification

Column 8, Line 18, Eq. 3, "$U(\boldsymbol{p},t) = \int_\psi U_S(\boldsymbol{p},t)dS = \int_\psi \beta(S)\cos(\omega t + \hat{\phi}_S(t))dS$"
should be -- $U(\boldsymbol{p},t) = \int_\psi U_S(\boldsymbol{p},t)dS = \int_\psi \beta(S)\cos(\omega t + \widehat{\phi_S}(t))dS$ --.

Column 9, Line 8, "$\zeta = \frac{\lambda\Gamma}{\Omega}$" should be -- $\zeta \approx \frac{\lambda\Gamma}{\Omega}$ --.

Column 11, Line 67, Eq. 13, "I$^{corr}$(u,v)=I*I'=Λ(u–λu,v–Δy)" should be
--I$^{corr}$(u,v)=I*I'=Λ(u–Δu,v–Δv)--.

Column 14, Line 67, Eq. 20, "$I_{tot}(\boldsymbol{p}) = \kappa\int_0^\tau \left(\int_{\psi_1\psi_2}\beta(S)\cos(\omega t + \hat{\phi}_S(t))dS\right)^2 dt$"
should be -- $I_{tot}(\boldsymbol{p}) = \kappa\int_0^\tau \left(\int_{\psi_1\psi_2}\beta(S)\cos(\omega t + \widehat{\phi_S}(t))dS\right)^2 dt$ --.

Column 15, Line 10, "$I_i(\boldsymbol{p}) = \kappa\int_0^\tau \left(\int_{\psi_1}\beta(S)\cos(\omega t + \hat{\phi}_S(t))dS\right)^2 dt$" should be
-- $I_i(\boldsymbol{p}) = \kappa\int_0^\tau \left(\int_{\psi_1}\beta(S)\cos(\omega t + \widehat{\phi_S}(t))dS\right)^2 dt$ --.

Column 16, Line 55, "12" should be --I$_2$--.

Column 16, Line 58, "12" should be --I$_2$--.

Signed and Sealed this
Twenty-sixth Day of February, 2019

Andrei Iancu
*Director of the United States Patent and Trademark Office*